United States Patent
Yamaguchi et al.

[11] Patent Number: 6,067,136
[45] Date of Patent: May 23, 2000

[54] BIREFRINGENCE-TYPE COLOR LIQUID CRYSTAL DISPLAY DEVICE

[75] Inventors: Tooru Yamaguchi; Yasushi Kaneko, both of Tokorozawa, Japan

[73] Assignee: Citizen Watch Co., Ltd., Tokyo, Japan

[21] Appl. No.: 09/120,462

[22] Filed: Jul. 23, 1998

[30] Foreign Application Priority Data

Jul. 23, 1997 [JP] Japan .................................. 9-197098
Sep. 22, 1997 [JP] Japan .................................. 9-256499

[51] Int. Cl.[7] .................................................. G02F 1/1335
[52] U.S. Cl. ........................................... 349/96; 349/97
[58] Field of Search ................................. 349/96, 97

[56] References Cited

U.S. PATENT DOCUMENTS

| | | | |
|---|---|---|---|
| 4,936,654 | 6/1990 | Suzaki et al. | 350/337 |
| 4,973,137 | 11/1990 | Kozaki | 350/339 |
| 5,119,220 | 6/1992 | Narita et al. | 359/73 |
| 5,555,114 | 9/1996 | Narita et al. | 359/65 |
| 5,583,678 | 12/1996 | Nishino et al. | 349/95 |
| 5,686,979 | 11/1997 | Weber et al. | 349/96 |
| 5,818,554 | 10/1998 | Hiyama et al. | 349/67 |
| 5,818,559 | 10/1998 | Yoshida | 349/96 |
| 5,828,488 | 10/1998 | Ouderkirk et al. | 349/96 |

FOREIGN PATENT DOCUMENTS

| | | |
|---|---|---|
| 6-242416 | 9/1994 | Japan . |
| 7-294896 | 11/1995 | Japan . |
| 8-5835 | 1/1996 | Japan . |
| 8-292413 | 11/1996 | Japan . |
| 9-5702 | 1/1997 | Japan . |
| 9-54316 | 2/1997 | Japan . |

*Primary Examiner*—William L. Sikes
*Assistant Examiner*—Tarifur R. Chowdhury
*Attorney, Agent, or Firm*—Armstrong, Westerman, Hattori, McLeland & Naughton

[57] ABSTRACT

A liquid crystal cell is made by filling a nematic liquid crystal between a pair of glass substrates having a transparent electrode on each confronting inside surface, a twisted retardation film or an ordinary retardation film being disposed as a birefringence layer on the visible side of the liquid crystal cell, and an absorption-type polarizing film being disposed on the outside thereof. On the opposite side to the visible side of the liquid crystal cell, a reflection-type polarizing film, a translucent absorbing film and a back light are disposed in that order. Through the above configuration, a bright reflection-type color display using outside light and a transmission-type color display using a back light can be obtained.

9 Claims, 13 Drawing Sheets

FIG. 2
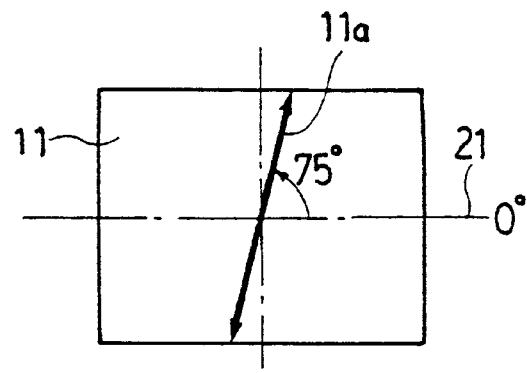
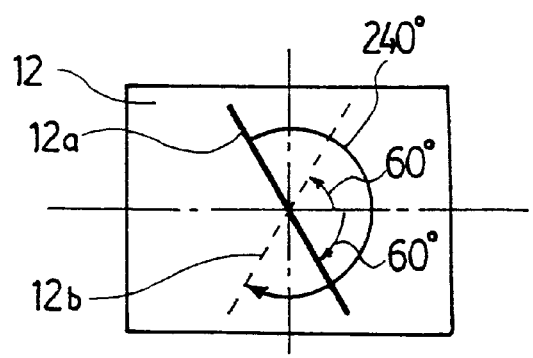
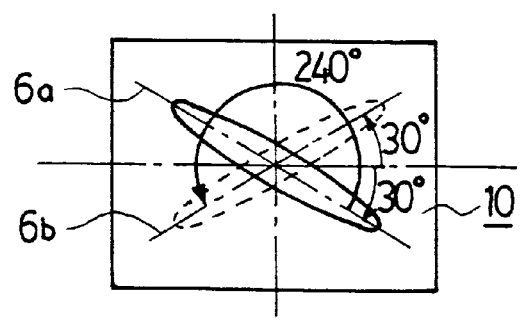
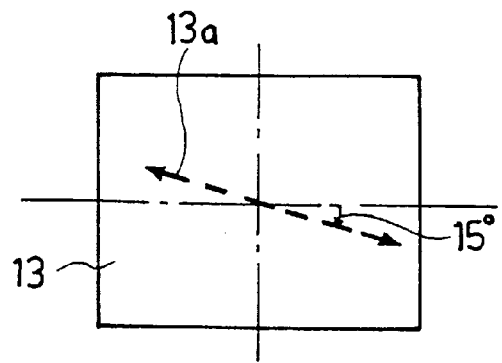

FIG.3a
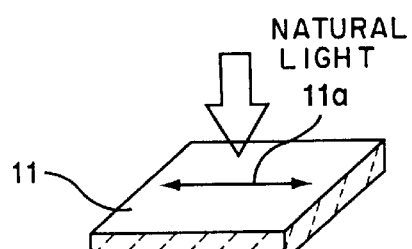
NATURAL LIGHT
11a
11
LINEARLY POLARIZED LIGHT
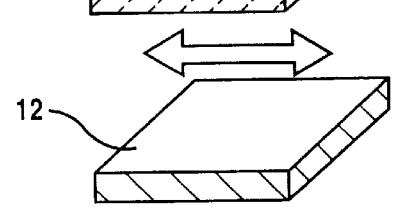
12
ELLIPTIC POLARIZED LIGHT
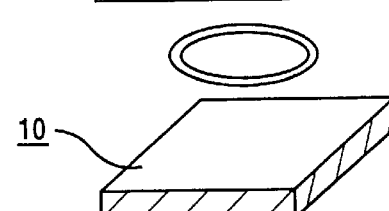
10
LINEARLY POLARIZED LIGHT
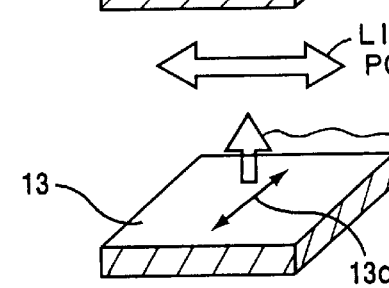
TOTAL REFLECTION
13
13a
WHEN NO VOLTAGE IS APPLIED
FIG.3b
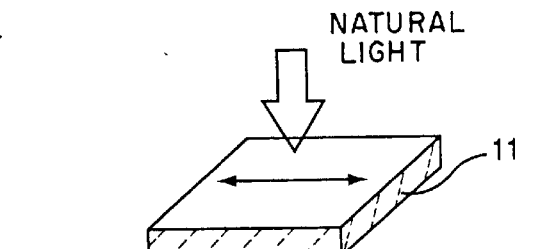
NATURAL LIGHT
11
LINEARLY POLARIZED LIGHT
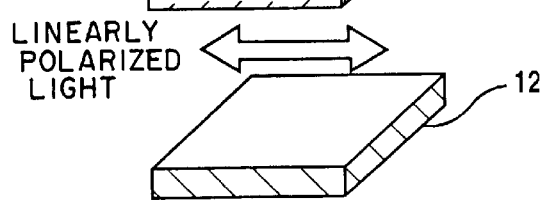
12
ELLIPTIC POLARIZED LIGHT
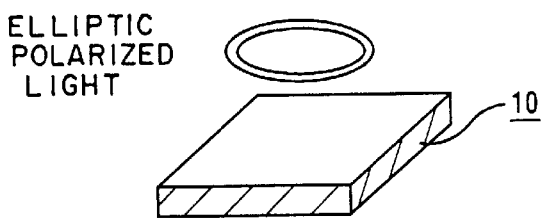
10
ELLIPTIC POLARIZED LIGHT
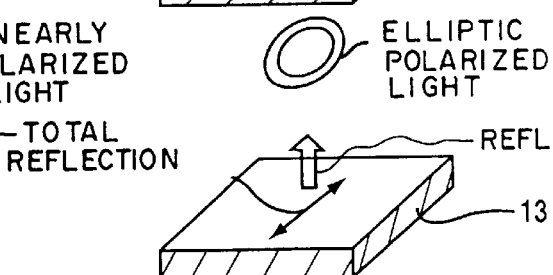
REFLECTION
13
TRANSMISSION
WHEN VOLTAGE IS APPLIED FIG. 8
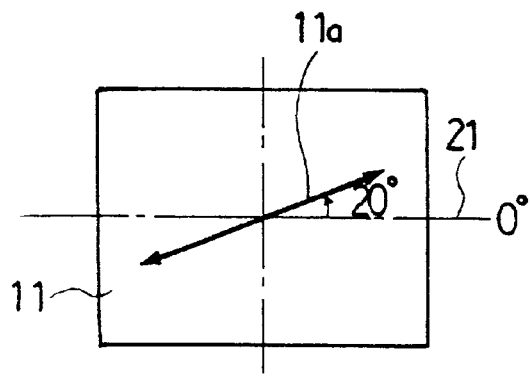
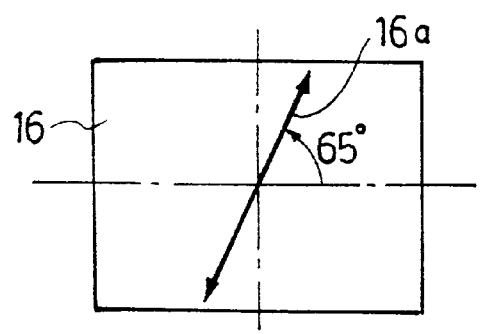
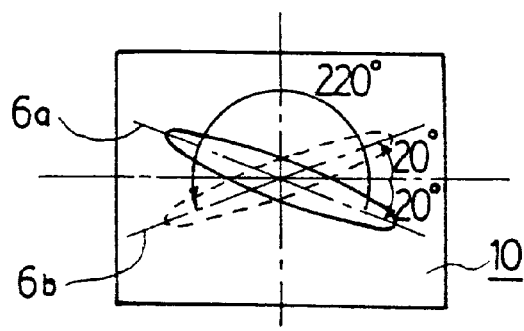
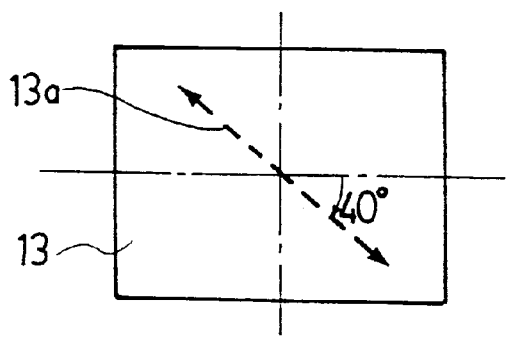

BIREFRINGENCE-TYPE COLOR LIQUID CRYSTAL DISPLAY DEVICE

BACKGROUND OF THE INVENTION

1. Field of the Invention

The present invention relates to a color liquid crystal display device, particularly to a color liquid crystal display device utilizing birefringence which can change display color by applied voltage without using color filters.

2. Description of the Related Art

Usually, a liquid crystal display device is configured with a liquid crystal cell in which an aligned liquid crystal is filled in between two confronting sheets of glass substrates, and an electrode pattern is formed on each of the two sheets of glass substrate. The display is performed through movement of the liquid crystal molecules caused by applying voltage on the liquid crystal layer between the electrodes.

In an ordinary color liquid crystal display device which performs color display with such a liquid crystal display device, each pixel of the liquid crystal display device is utilized as an optical shutter, and one unit of color is displayed by pixels in sets of three in which each of the pixels is provided with a red (R), green (G) or blue (B) color filter.

A disadvantage in this case is that when, for instance, only red is displayed as a displaying color, only those pixels provide with the red color filter are in a display state out of the sets of three pixels, leaving the other pixels with green and blue color filters in a shielded state, which results in making the theoretical utilization efficiency of the incident light about one third.

Consequently, when it is used as a transmission-type display devices where a back light is used, there is no big disadvantage. However, when it is used as a reflection-type display device, where external light is used, since a sufficient amount of light cannot be obtained, the display device performs poorly due to the lack of brightness in the reflecting light.

As a means to solve the above described disadvantage, a birefringence-type color liquid crystal display device is proposed, in which the coloring state of a pixel itself is changed by utilizing a phenomenon in which the color can be continuously changed in accordance with applied voltages due to the birefringence effect of a liquid crystal cell, which provides a new way to effect color display without using color filters.

Particularly in recent years, as is seen, for instance, in Japanese Patent Laid-open Bulletin No. Hei 9-5072, a new method of performing more effective color display is proposed not by utilizing only the birefringence effect caused by a single liquid crystal cell but by adding a retardation film to the liquid crystal cell and utilizing a combination of the birefringence effect of the retardation film and the liquid crystal layer.

According to this method, since color display is performed by changing the spectral characteristics of a single pixel itself, that is, by changing the coloring state of the pixel, the theoretical utilization efficiency of light is three times higher than that of the color filter method which requires three pixels to exhibit one color cell, and sufficient brightness can be obtained even when color display is performed in a reflection-type display device.

Thus, a colorful color display can be obtained with a comparatively simple structure with a relatively low cost, which makes it possible to apply this device to the display portion of portable information equipment such as a game machine, a digital watch, a portable telephone and so on.

The above described birefringence-type color liquid display device can be said to be an excellent display device when it is used as a reflection-type color liquid crystal display device under the circumstance where ambient light is very bright.

However, in order to obtain sufficient visibility when ambient light is dark, for instance at night, illumination by a back light is usually required. But since a conventional birefringence-type color liquid crystal display device uses a reflector, the light coming from the back light is blocked, so that the device cannot be used as a transmission-type display device.

Certainly, in order to make it possible to use a back light, by using not a complete reflector but a transflective reflector which can transmit incident light at some transmittance, the use of the back light becomes possible.

In such a case, however, the transmittance of the transflective reflector is from 30 to 50%, resulting in a corresponding reduction in the reflectance and the brightness required for reflection-type display becomes insufficient.

The first object of the present invention is to make a birefringence-type color liquid crystal display device that is a sufficiently bright display when used as a reflection-type display device and that is satisfactorily usable as a transmission-type display device using a back light.

In a color liquid crystal display device described in Japanese Patent Laid-open Bulletin No. Hei 9-5072, the dispositional relationship between a polarizing film and liquid crystal molecules in the liquid crystal cell is taken to form an angle with which the maximum birefringence effect can be obtained, that is, the angle between the optical axis (transmittable axis or an absorption axis) and the long axis direction of the adjacent liquid crystal molecules is formed to be about 45°.

The $\Delta nd$ value expressed by the product of the difference $\Delta n$ of the birefringence of the liquid crystal layer of the liquid crystal cell and a cell gap d which is the space between a pair of substrates, and a retardation value of the retardation film, are not so different from each other and are substantially the same values, or within 200 nm if any.

However, the above described structure is not the optimal structure for a birefringence-type color liquid crystal display device and it is difficult to make the spectral characteristics at the time of displaying in each color to be the ideal spectral characteristics. From the viewpoint of color reproduction, the above described structure is considerably inferior when compared with a color liquid crystal display device using color filters.

This is because, firstly, there is a difference between the wavelength dependence characteristics of the $\Delta nd$ value of the liquid crystal cell and the retardation value of the retardation film. Besides, there is a difference in the birefringence effect between the presence and absence of twist in the liquid crystal cell and the retardation film.

Then, a second object of the present invention is to provide a birefringence-type color liquid crystal display device which solves the disadvantage of such a reduction in the color reproductivity and has superior color reproductivity.

SUMMARY OF THE INVENTION

In order to achieve the first object to make a color liquid crystal display device usable with a sufficiently bright display as a reflection-type display device or as a transmission-type display device using a back light, a color liquid crystal display device is structured as follows.

The color liquid crystal display device according to the present invention is provided with a liquid crystal cell prepared in such a manner that nematic liquid crystal is filled in between a pair of transparent substrates having an electrode on confronting inside surfaces thereof, an absorption-type polarizing film is disposed on the visible side of the liquid crystal cell, and a reflection-type polarizing film is disposed on a side opposite to the visible side.

Further, a birefringence layer composed of a twisted retardation film or an ordinary retardation film is disposed between the visible side of the liquid crystal cell and the absorption-type polarizing film, or between the side opposite to the visible side of the liquid crystal cell and the reflection-type polarizing film.

The above described absorption-type polarizing film is a polarizing film which absorbs linearly polarized light having a vibration plane in a perpendicularly intersecting direction to transmittable axis, and the above described reflection-type polarizing film is a polarizing film which reflects linearly polarized light having a vibration plane in a perpendicularly intersecting direction to transmittable axis.

In the color liquid crystal display device it is desirable to dispose a back light on the outside of the above described reflection-type polarizing film, or to dispose translucent absorbing film and back lights in that order.

For the above liquid crystal cell, it is preferable to use a super twist nematic-type liquid crystal cell having a twist angle of 180° to 270°.

According to the above color liquid crystal display device, when no voltage is applied on the liquid crystal cell, the light incident from the visible side passes through the absorption-type polarizing film, the birefringence layer, and the liquid crystal cell and reaches the reflection-type polarizing film in the state of substantially linearly polarized light.

Then, when the reflection-type polarizing film is disposed in such a manner that the transmittable axis intersects at right angles with the vibration direction, almost all the linearly polarized light arriving at the reflection-type polarizing film is reflected and returns to the incident side.

The reflected light in this case experiences total reflection, so that a mirror image silver metallic display is observed on the visible side.

When voltage is applied to the liquid crystal cell, the light arriving at the above described reflection-type polarizing film becomes elliptic polarized light. The polarization state of the elliptic polarized light differs depending to the applied voltage value. Therefore, it is possible to change components of the light reflected to the incident side by changing the voltage, that is, it is possible to change colors by changing the voltage.

Thus, a background portion in the liquid crystal cell on which no voltage is applied is an extremely bright silver metallic color, and an electrode portion on which voltage is applied is in a coloring state where display by reflecting light having a different color tone depending on the applied voltage can be obtained, so that a characteristic color liquid crystal display can be put into practice.

When a back light is used, since the reflection-type polarizing film has a function so as to allow theoretically half of the incident light from the back light to pass through to the liquid crystal cell side, the structure can function as a transmission-type color liquid crystal display device. The color of the transmittable light in this case is a complementary color to the color of the reflected light.

Thus, a color liquid crystal display device having completely new characteristics compared with conventional color liquid crystal display devices can be obtained. The characteristics are such that an extremely bright reflection-type color display without using a reflector, and a transmission-type color display using a back light, can be obtained, and moreover the relationship in display colors between reflection and transmission is a complementary color relationship.

Additionally, in order to achieve the second object to solve the disadvantage that in the conventional birefringence-type color liquid crystal display device the color reproductivity are lowered, and to realize better color reproductivity, the above described color liquid crystal display device is defined as follows.

A super twist nematic type liquid crystal cell having a twist angle from 180° to 270° is used as the above liquid crystal cell, the above described birefringence layer is formed with one sheet or several sheets of retardation films, and the sum total of the retardation of the retardation films is made to be larger than the $\Delta$nd value of the liquid crystal cell by 250 to 350 nm. An angle between the transmittable axis of the above described reflection-type polarizing film and the long axis direction of liquid crystal molecules contacting with an inner surface of the substrate on the reflection-type polarizing film side of the above described liquid crystal cell is made to be in the range of 35°±5.

Thus, by defining the twist angle of the liquid crystal cell, the retardation value of the retardation film, and the range of the angle between the transmittable axis of the reflection-type polarizing film and the long axis direction of the liquid crystal molecules contacting with the inner surface of the reflection-type polarizing film side substrate, a birefringence-type color liquid crystal display device having excellent color reproductivity can be obtained.

The above and other objects, features and advantages of the invention will be apparent from the following detailed description which is to be read in conjunction with the accompanying drawings.

BRIEF DESCRIPTION OF THE DRAWINGS

FIG. 2 is a plane view showing an angle of an optical axis in the color liquidcrystal display device;

FIG. 3 is an explanatory perspective view explaining a display principle of the color liquid crystal display device according to the first embodiment;

FIG. 8 is a plane view showing an angle of an optical axis in the color liquid crystal display device;

DETAILED DESCRIPTION OF THE PREFERRED EMBODIMENTS

Several preferred embodiments of a color liquid crystal display device according to the present invention will be explained next with reference to the drawings.

First Embodiment: FIG. 1 to FIG. 5

Figure 1:
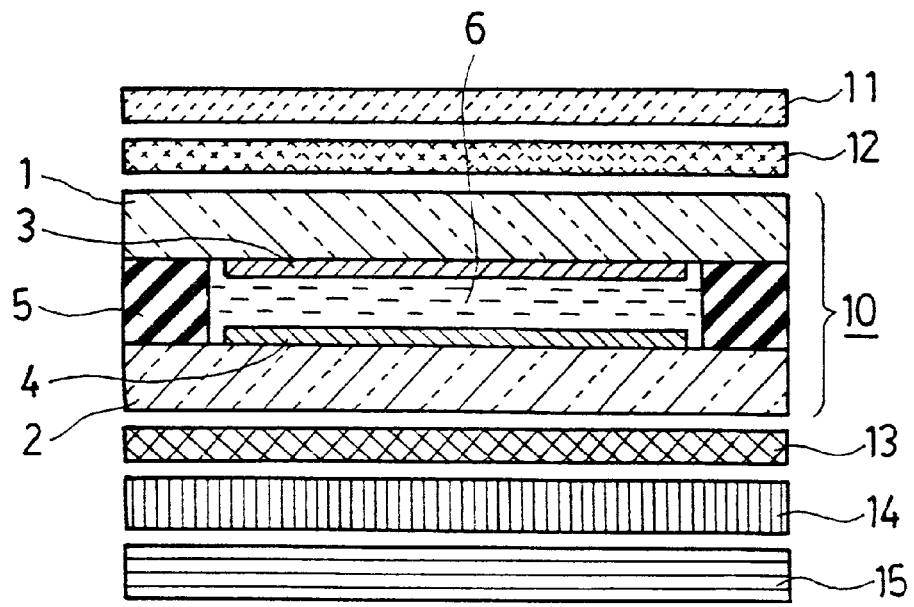
FIG. 1 is a schematic sectional view showing a structure of a first embodiment of a color liquid crystal display device according to the present invention.

The first embodiment of the present invention will be explained first with reference to the drawings from FIG. 1 to FIG. 5. FIG. 1 is a schematic sectional view showing a structure of the color liquid crystal display device, substantially enlarging the size in the thickness direction. FIG. 2 is a plane view showing the disposition of each optical axis in the structure in FIG. 1.

As shown in FIG. 1, the color liquid crystal display device of the first embodiment is structured in such a manner that an upper glass substrate 1 on which a first transparent electrode 3 is formed and a lower glass substrate 2 on which a second transparent electrode 4 is formed, are adhered to each other through a sealing member 5, and a super twist nematic (STN) liquid crystal cell 10 is formed by filling a nematic liquid crystal 6 which is twist aligned at a twist angle of 240° in the gap between the pair of glass substrates 1 and 2. Incidentally, the transparent electrodes 3 and 4 are formed with indium tin oxide (ITO).

A twisted retardation film 12 is disposed as a birefringence layer on the top side of the upper glass substrate 1, namely the visible side, in the liquid crystal cell 10, and at the outside thereof, an absorption-type polarizing film 11 is disposed.

A reflection-type polarizing film 13 is disposed on the bottom side of the lower glass substrate 2, namely the side opposite to the visible side, in the liquid crystal cell 10, and to the outside thereof (i.e. at the bottom in FIG. 1), and a translucent absorbing film 14 as a translucent absorbing member and a back light 15 are disposed in that order.

Here, the absorption-type polarizing film 11 is a polarizing film (sheet) which has the function of transmitting linearly polarized light having a vibration plane in the direction parallel to the transmittable axis and of absorbing linearly polarized light having a vibration plane in the direction perpendicular to the transmittable axis.

The reflection-type polarizing film 13 is a polarizing film which has the function of transmitting linearly polarized light having a vibration plane in the direction parallel to the transmittable axis and of reflecting linearly polarized light having a vibration plane in the direction perpendicular to the transmittable axis.

The translucent absorbing film 14 may be formed by adhering a sheet made of a translucent absorbing material or by coating a translucent material on the back of the liquid crystal cell 10 or on the upper surface of the reflection-type polarizing film 13 to form a translucent absorbing layer.

Next, the arrangement angle and the angle of the optical axis of each element will be explained with reference to FIG. 2. As a basis axis of the angle, the direction of three o'clock on an imaginary clock when the liquid crystal display device (panel) is seen from above is assumed to be the basis axis 21 and its angle is set to be 0°.

In the liquid crystal cell 10, the alignment direction 6a of the upper liquid crystal in the inside surface of the upper glass substrate 1 forms an angle of 30° clockwise with the basis axis 21, and the alignment direction 6b of the lower liquid crystal in the inside face of the lower glass substrate 2 forms an angle of 30° counterclockwise with the basis axis 21. Consequently, the twist angle of the liquid crystal molecules from the alignment direction 6a of the upper liquid crystal to the alignment direction 6b of the lower liquid crystal is 240° counterclockwise.

The twisted retardation film 12 is disposed in such a manner that its lower phase-delay axis 12b (molecular alignment direction) intersects at right angles with the alignment direction 6a of the upper liquid crystal of the liquid crystal cell 10.

That is, the lower phase-delay axis 12b of the twisted retardation film 12 forms an angle of 60° counterclockwise with the basis axis 21 and the upper phase-delay axis 12a (molecular alignment direction) forms an angle of 60° clockwise with the basis axis 21.

Accordingly, the twist angle of the molecules from the upper phase-delay axis 12a of the twisted retardation film 12 to the lower phase-delay axis 12b is 240° clockwise. Namely, the twist angle between the upper phase-delay axis 12a of the twisted retardation film 12 and the lower phase-delay axis 12b is 240°, nearly the same as the twist angle of the liquid crystal cell 10, but the twist direction is in the reverse direction.

The transmittable axis 11a of the absorption-type polarizing film 11 above the liquid crystal cell 10 is disposed to form an angle of 45° with the upper phase-delay axis 12a of the twisted retardation film 12. That is, its transmittable axis 11a forms an angle of 75° counterclockwise with respect to the basis axis 21.

The transmittable axis 13a of the reflection-type polarizing film 13 below the liquid crystal cell 10 is disposed to intersect at right angles with the transmittable axis 11a of the absorption-type polarizing film 11. That is, the transmittable axis 13a forms an angle of 15° clockwise with respect to the basis axis 21.

The display principles of the liquid crystal display device will be explained with reference to FIG. 3. First, (a) the case where no voltage is applied, which is on the left on FIG. 3, will be explained.

When natural light having random polarizing directions, entering from the visible side (the upper side in the drawing), passes through the absorption-type polarizing film 11, the component of the light polarized in the direction perpendicular to the transmittable axis 11a, namely, in the absorption axis direction, is absorbed and the incident light is changed into linearly polarized light having a polarization parallel to the transmittable axis.

When the incident light changed into linearly polarized light passes through the twisted retardation film 12, the linearly polarized light is deformed to become elliptic polarized light due to the birefringence effect.

The elliptic polarized light enters into the liquid crystal cell 10. When no voltage is applied between the transparent electrode 3 and 4 of the liquid crystal cell 10, the sum of the birefringence effect becomes nearly zero, because Δnd values of the twisted retardation film 12 and the liquid crystal cell 10 are the same, and the twist directions are in the reverse and deviate at an angle of 90° from each other.

Therefore, the elliptic polarized light is returned to its original state when it passes through the liquid crystal cell 10, and the emitted light from liquid crystal cell 10 becomes linearly polarized light having the same vibration direction as that of the initial linearly polarized light after passage through the absorption-type polarizing film.

Since the transmittable axis 13a of the reflection-type polarizing film 13 is disposed perpendicular (at intersecting angles of 90°) to the transmittable axis 11a of the absorption-type polarizing film 11, among the components of the linearly polarized light which enter into the reflection-type polarizing film 13, no component passes through the reflection-type polarizing film 13, and all components are reflected to return to the visible side.

Since reflection by the reflection-type polarizing film 13 is total reflection, it is seen to be a mirror image silver metallic color from an observer on the visible side. Accordingly, without providing the reflector, about half of the incident light from the visible side, that is almost all of the light passing through the absorption-type polarizing film 11 is reflected and returned, and a characteristic display having an extremely bright and silver-metallic color can be obtained.

Next, the principle of the mechanism under a situation when voltage is applied is explained with reference to the drawing in FIG. 3, on the right side (b).

About half of the incident light composed of natural light coming from the visible side penetrates through the twisted retardation film 12 to become elliptic polarized light and enters into the liquid crystal cell 10. The situation until this step is the same as that when no voltage is applied.

When voltage is applied between the first transparent electrode 3 and the second transparent electrode 4 of the liquid crystal cell 10 shown in FIG. 1 so as to apply an electric field on the nematic liquid crystal 6, the liquid crystal molecules rise, and the Δnd value of the liquid crystal cell decreases. The Δnd value is expressed by the product of the difference Δn of birefringence of the liquid crystal 6 and the cell gap d, that is the space between electrodes 3 and 4.

Consequently, the birefringence effect of the liquid crystal cell 10 becomes smaller than the birefringence effect of the twisted retardation film 12, the elliptic polarized light entering into the liquid crystal cell 10 does not return to the original linearly polarized light state, though the polarized state differs, and enters into the reflection-type polarizing film 13 in an elliptic polarized state. The polarized state at this time differs according to the voltage applied to the liquid crystal cell 10.

In the elliptic polarized light entering into the reflection-type polarizing film 13, the component which is parallel to the transmittable axis 13a transmits. Half of the transmitted light is absorbed by the translucent absorbing film 14 shown in FIG. 1 disposed below the reflection-type polarizing film 13, the remaining half transmits through the translucent absorbing film 14, and reaches the back light 15.

In the incident elliptic polarized light, the component intersecting at right angles with the transmittable axis 13a of the reflection-type polarizing film 13 is reflected and is returned to the visible side. The wavelength band area of the reflected light differs depending on the polarized state of the elliptic polarized light entering into the reflection-type polarizing film 13. Therefore, by changing the polarized state of the elliptic polarized light through controlling the voltage applied to the liquid crystal cell 10, the wavelength band area of the reflected light, namely, the coloring state, can be changed. That is, reflected light having continuously varying colors can be obtained with one pixel.

Therefore, display of information with letters and figures in several colors on a silver metallic background can be performed using the reflection of natural light.

Next, the display using the back light 15 will be explained.

The color liquid crystal display device displays extremely brightly because it theoretically reflects half of the incident light when no voltage is applied, and does not require light from a back light under normal illumination circumstances. However, under dark circumstances such as at night, a back light is required to obtain the visibility.

Here, when the back light 15 is turned on, in the light from the back light, the component parallel to the transmittable axis 13a of the reflection-type polarizing film 13 passes through to the visible side, and the component perpendicular to the transmittable axis 13a reflects to return to the back light side 15.

The component of the light transmitted towards the visible side is the same component as that of the light which transmits through the reflection-type polarizing film 13 and is absorbed to the translucent absorbing film 14, as in the explanation using FIG. 3. This is the component having a polarized state which intersects at right angles with the light reflected by the reflection-type polarizing film 13. As for color tone, it is in a relation of complementary colors with the color of the reflecting light. For instance, with respect to silver metallic color tone which is the reflection color in a no voltage state, the transmitted light is black, and in relation to red which is the reflection color on the display area, the transmitted light is cyan.

A specific example will be shown below. The difference Δn in the birefringence of the nematic liquid crystal is 0.2, and the cell gap d is taken to be 8 μm, so that the Δnd value of the liquid crystal cell 10 is 1600 nm. A twisted retardation film 12 which is a birefringence layer, having a twist angle of 240° clockwise, and a Δnd value of 1600 nm, is used. That is, the Δnd value of the liquid crystal cell is equal to the Δnd value of the twisted retardation film.

As a reflection-type polarizing film 13, Optical Film DBEF (trade name) sold by Sumitomo 3M Co. Ltd is used.

In a color liquid crystal display device formed using the above described liquid crystal cell 10, the twisted retardation film 12, and the reflection-type polarizing film 13, when no voltage is applied on the liquid crystal cell 10, light which passes through the absorption-type polarizing film 11 enters into the reflection-type polarizing film 13 after passing through the twisted retardation film 12 and the liquid crystal cell 10, in a linearly polarized state in such a manner that the vibration plane is in a direction perpendicular to the transmittable axis 13a of the reflection-type polarizing film 13. And since almost all of the light is reflected to return to the visible side by the reflection-type polarizing film 13, it attains a substantially mirror image silver metallic display.

Figure 4:
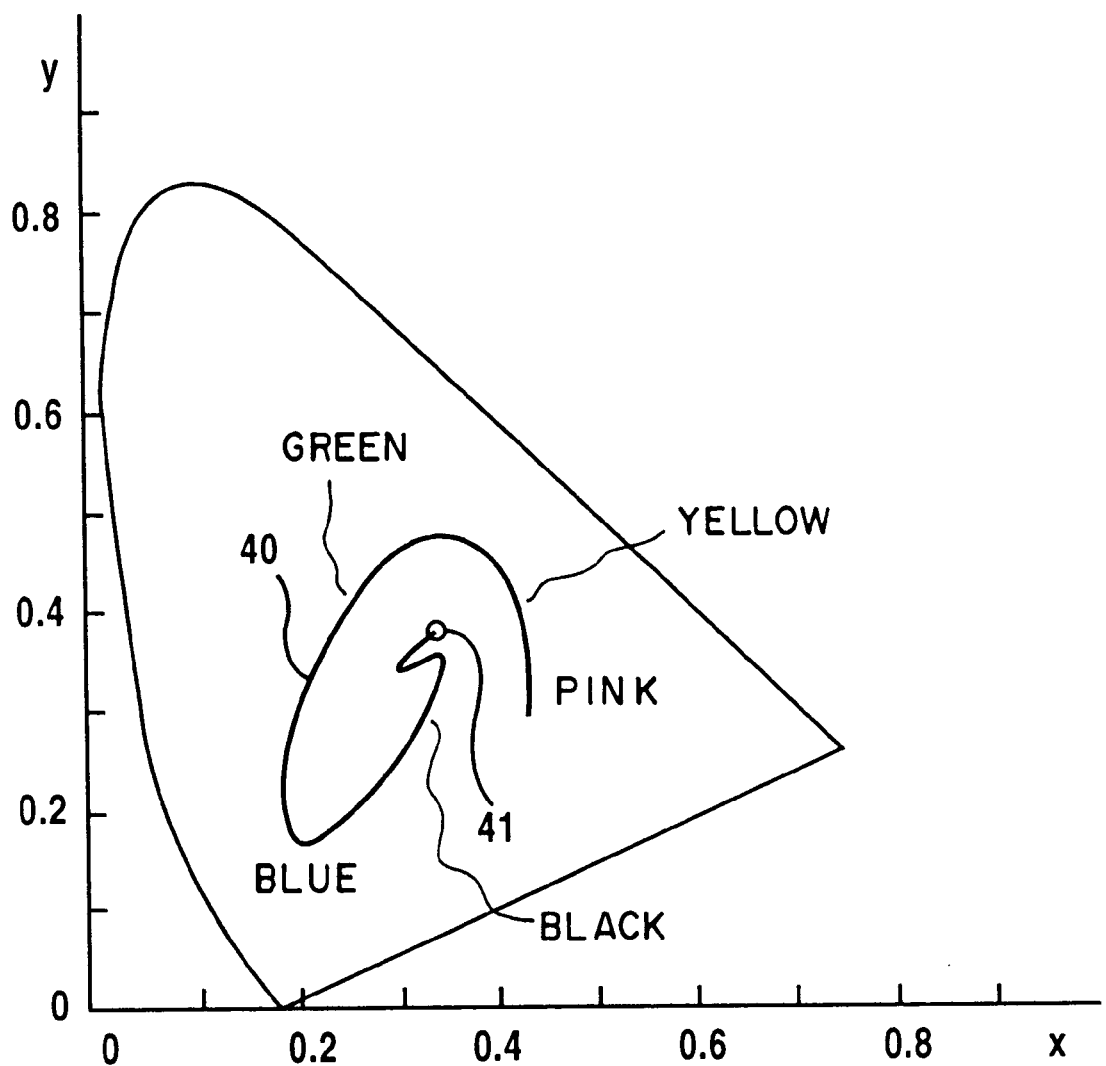
FIGS. 4 and 5 are the CIE 1931 chromaticity diagrams showing chromaticity transition curves of the reflected light and transmitted light in the color liquid crystal display device of the first embodiment, respectively.

Next, when voltage is applied between the first transparent electrode 3 and the second transparent electrode 4 of the liquid crystal cell 10, and the voltage is gradually increased, the light that has passed through the twisted retardation film 12 and the liquid crystal cell 10 becomes elliptic polarized light, and the electrode portion exhibits reflection colors which is shown by the chromaticity transition curve 40 in the CIE 1931 chromaticity diagram in FIG. 4, having a color change on the display from silver metallic at an initial stage 41 to black, blue, green, yellow, and pink in accordance with the increase in the voltage.

Consequently, the liquid crystal display device of the present embodiment can display in multi-color in which colorful reflection colors continuously change on a bright silver metallic background without using a reflector, and an extremely bright characteristic display can be realized.

Next the case when a back light 15 below the translucent absorbing film 14 is turned on under weak and dark surrounding light will be explained.

In the color liquid crystal display device, when the back light 15 is turned on, and the light is allowed to enter the visible side through the reflection-type polarizing film 13, in the light from the back light, the component parallel to the transmittable axis 13a of the reflection-type polarizing film 13 passes therethrough and enters into the liquid crystal cell 10, and the component perpendicular to the transmittable axis 13a is reflected and is sent back to the back light side.

Therefore, when transmitting light from the back light 15 is used, the display device works as a transmission-type birefringence system color liquid crystal display device.

When the back light 15 is turned on, the color liquid crystal display device of the present embodiment shields almost all the light from the back light and forms a dark state with no voltage applied on the liquid crystal cell 10.

Figure 5:
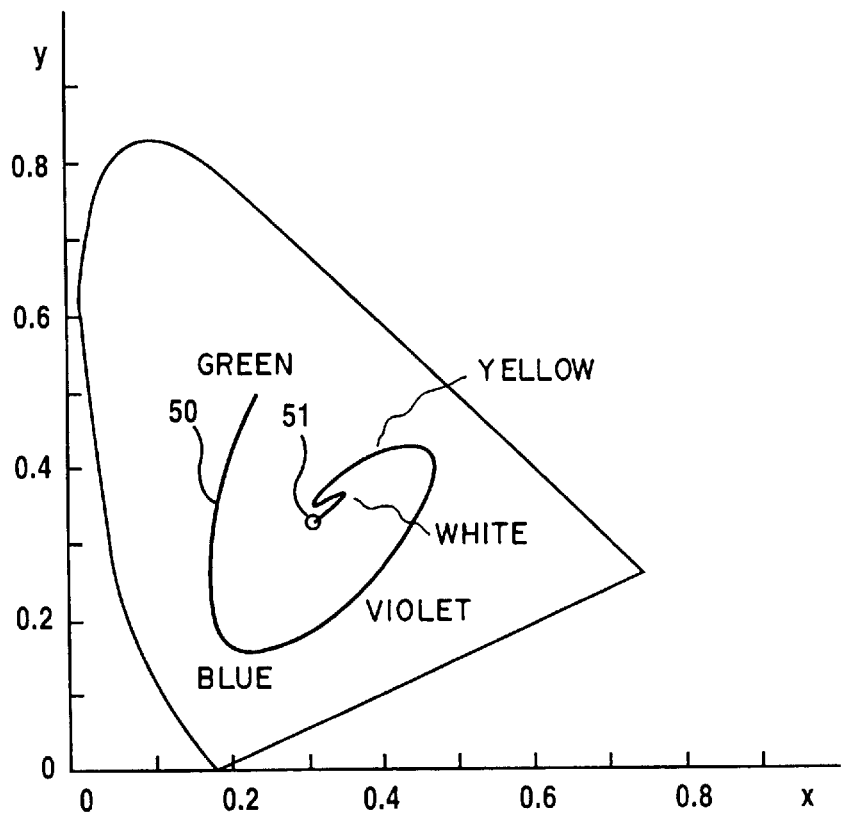

Next, when voltage is applied between the first transparent electrode 3 and the second transparent electrode 4 of the liquid crystal cell 10, and the voltage is gradually increased, the transmitting light in the electrode portion exhibits color of the transmitting light which is shown by the chromaticity transition curve 50 in the CIE 1931 chromaticity diagram in FIG. 5, having a color change from a dark state of an initial stage 51 to white, yellow, violet, blue, and green in accordance with the increase of voltage. This shows a complementary color relation to the color of the reflecting light.

That is, when the back light is used, a displaying color in a complementary color relation to the colors of the reflecting light can be obtained with the same applied voltage, and a bright characteristic display can be realized.

Thus, the color liquid crystal display device according to the present embodiment can perform display as a bright reflection-type color liquid crystal display device without using a reflector by disposing a reflection-type polarizing film on the side opposite to the visible side of the liquid crystal cell, and it can perform well as a transmission-type color liquid crystal display device by using a back light.

When performing reflection-type display, a completely new characteristic display in a mirror image silver metallic color can be obtained in the no-voltage portions of the liquid crystal cell.

Additionally, a characteristic display in which the device reverses the displaying color in a complementary color relation between reflection-type display and transmission-type display is obtained.

Figure 6:
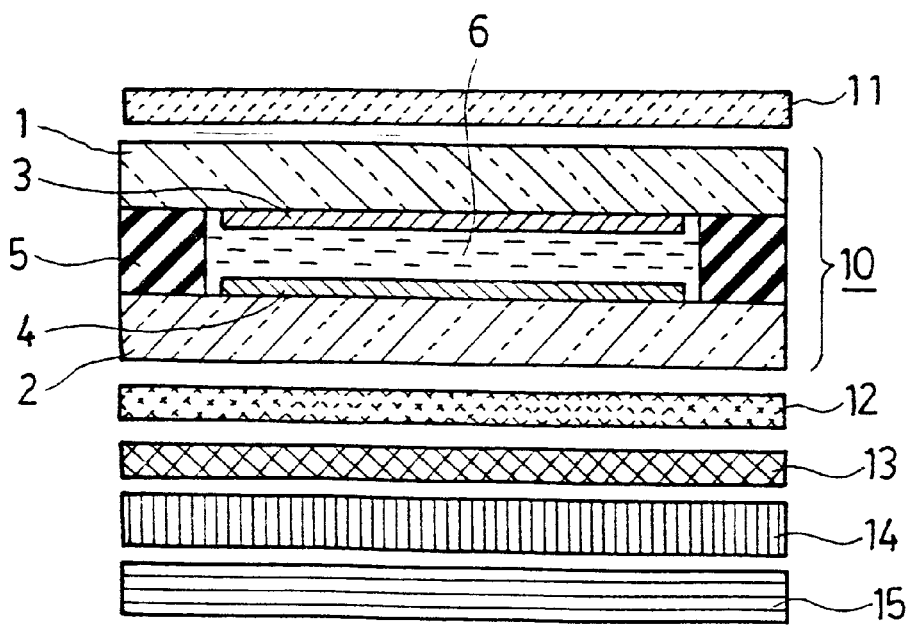
FIG. 6 is a schematic sectional view showing a structure of a modification of the first embodiment of the color liquid crystal display device according to the present invention.

Modification of the First Embodiment: FIG. 6

In a color liquid crystal display device of the above described first embodiment, as shown in FIG. 1, the twisted retardation film 12, that is a birefringence layer, is disposed between the visible side of the liquid crystal cell 10 and the absorption-type polarizing film 11, but as shown in FIG. 6, a twisted retardation film 12 can be disposed between the side opposite to the visible side of the liquid crystal cell 10 and the reflection-type polarizing film 13.

Even with the above structure, a color display function substantially equivalent to the color liquid crystal display device of the above described first embodiment can be provided.

Additionally, the translucent absorbing film 14 can be omitted to make the upper surface of the back light 15 to also serve as the translucent absorbing film 14. When a source of light is provided in a device having the color liquid crystal display device inside thereof, the back light 15 can also be omitted.

Second Embodiment; FIG. 7 to FIG. 10

Figure 7:
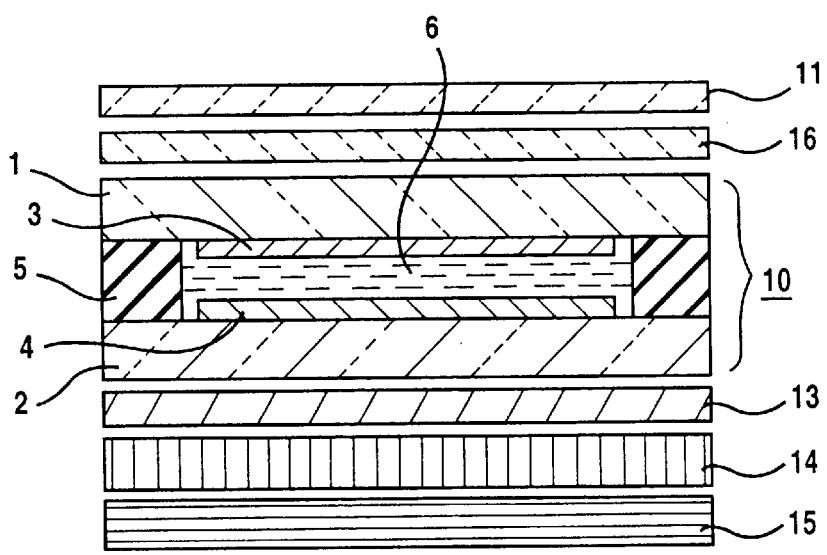
FIG. 7 is a schematic sectional view showing a structure of a second embodiment of the color liquid crystal display device according to the present invention.
Figure 9:
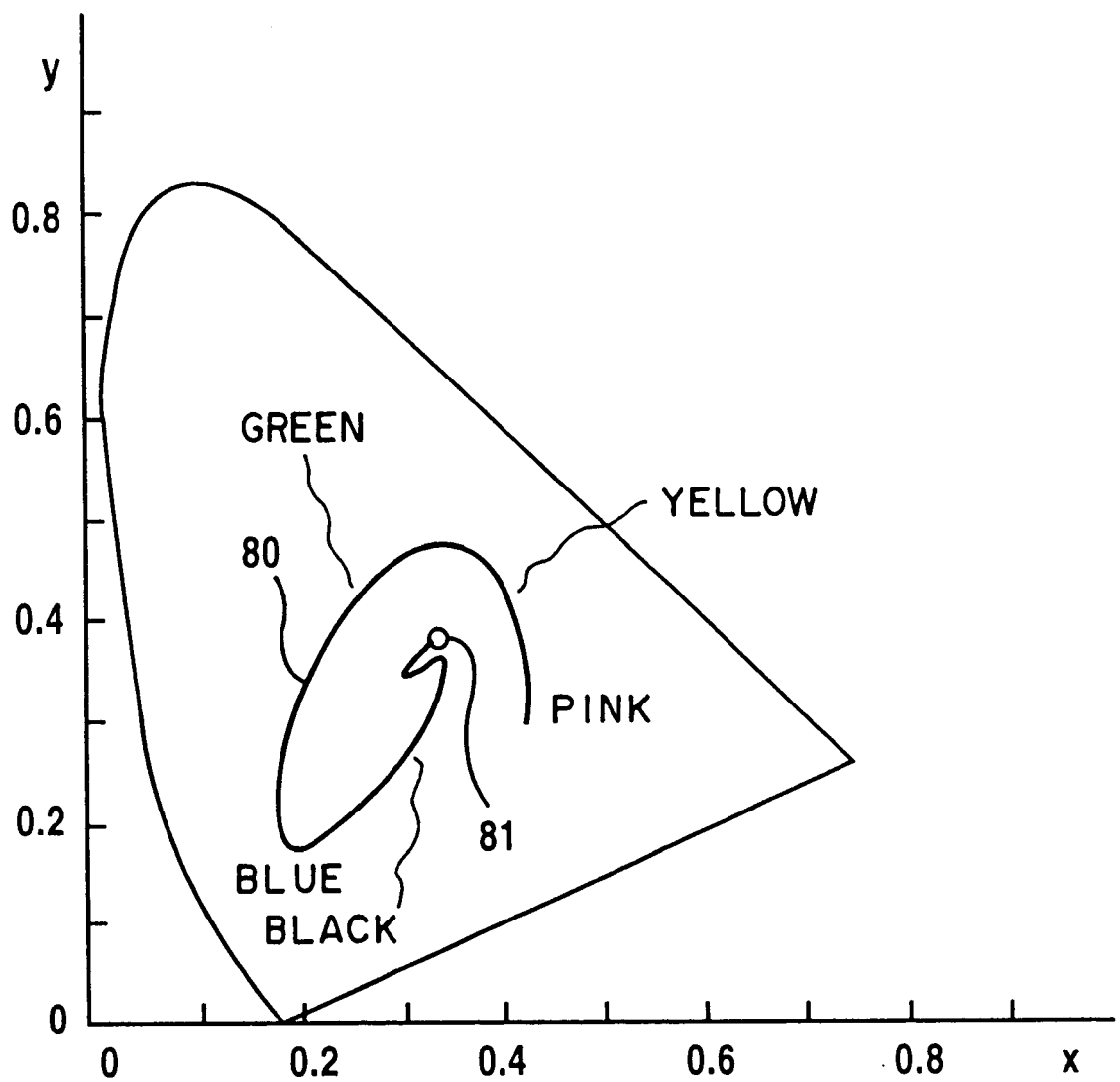
FIGS. 9 and 10 are the CIE 1931 chromaticity diagrams showing chromaticity transition curves of the reflected light and transmitted light in the color liquid crystal display device of the second embodiment, respectively.

Next, the second embodiment of the present invention will be explained with reference to FIG. 7 to FIG. 10. FIG. 7 is a sectional view similar to FIG. 1 showing a configuration of the color liquid crystal display device, and FIG. 8 is a plane view showing relationships of the optical axes of respective element. In these drawings, portions corresponding to FIG. 1 and FIG. 2 are given the same symbols or numerals and explanation thereof is omitted.

In the color liquid crystal display device of the second embodiment, as shown in FIG. 7, an ordinary uniaxial stretching or biaxial stretching retardation film 16 is disposed between the visible side of the liquid crystal cell 10 and the absorption-type polarizing film 11 as a birefringence layer, instead of the twisted retardation film 12 in FIG. 1.

The retardation film 16 is a biaxial stretching film having a relation of nx>nz>ny, in which nx is the refractive index in the direction of stretching in the plane, ny is a refractive index in the direction perpendicular to the stretching direction in the plane, and nz is the refractive index in the thickness direction.

Next, the arrangement angle and the angle of the optical axis of each element will be explained with reference to FIG. 8. As a basis axis of the angle, the direction of three o'clock on an imaginary clock when a liquid crystal display device is seen from above is assumed to be basis axis 21 and its angle is set to be 0°.

In the liquid crystal cell 10, the alignment direction 6a of the upper liquid crystal forms an angle of 20° clockwise with respect to the basis axis 21, and the alignment direction 6b of the lower liquid crystal forms an angle of 20° counterclockwise with respect to the basis axis 21. Consequently, the twist angle of the liquid crystal molecules from the alignment direction 6a of the upper liquid crystal with respect to the alignment direction 6b of the lower liquid crystal 6b is 220° counterclockwise.

In the retardation film 16, the stretching axis 16a forms an angle of 65° counterclockwise with respect to the basis axis 21.

The transmittable axis 11a of the absorption-type polarizing film 11 above the liquid crystal cell 10 forms an angle of 20° counterclockwise with respect to the basis axis 21. The transmittable axis 13a of the reflection-type polarizing film 13 below the liquid crystal cell 10 forms an angle of 40° clockwise with respect to the basis axis 21.

In the first embodiment where a twisted retardation film is used as a birefringence layer, when no voltage is applied on the liquid crystal cell, the sum of the birefringence effect of the twisted retardation film and the liquid crystal cell is set to be zero as previously described, but when a retardation film is used instead of a twisted retardation film, by optimizing the arrangement angle, the sum of the birefringence effect of the retardation film and the liquid crystal layer can be set to be substantially zero when no voltage is applied to the liquid crystal cell.

The state of the display in this case is nearly the same as the case when the twisted retardation film is used. That is, when displaying with reflection light coming from outside light, a silver metallic color is displayed with no voltage applied on the liquid crystal cell, and color by birefringence is displayed as a reflection color when voltage is applied. When displaying with the transmitted light using a back light, the displaying color is in a complementary color relation to the reflecting color.

A concrete example will be shown below. The liquid crystal cell 10 is formed in such a manner that the Δn of the nematic liquid crystal 6 is 0.2, the cell gap d is 8 μm, and the Δnd value is 1600 nm. The retardation film 16 is an NRZ (trade name) film manufactured by Nitto Denko K.K. and the retardation value is 1770 nm.

As the reflection-type polarizing film 13, Optical Film DBEF (trade name) sold by Sumitomo 3M Co. Ltd. is used.

In the color liquid crystal display device of the present example, when no voltage is applied on the liquid crystal cell 10 shown in FIG. 7, in the incident ambient light from the visible side, light that has passed through the absorption-type polarizing film 11 enters into the reflection-type polarizing film 13 in a state of linearly polarized light in which the vibration plane is in a direction perpendicular to the transmittable axis 13a of the reflection-type polarizing film 13, after passing through the retardation film 16 and the liquid crystal cell 10. Accordingly, the incident light is largely reflected by the reflection-type polarizing film 13 and returns to the visible side, so that substantially mirror image silver metallic display is obtained.

On the other hand, when voltage is applied between the first transparent electrode 3 and the second transparent electrode 4 of the liquid crystal cell 10, and the voltage is gradually increased, the light that has passed through the retardation film 16 and the liquid crystal cell 10 becomes elliptic polarized light. The electrode portion exhibits reflection colors in such a manner that the chromaticity transition curve 80 follows the trace from the initial stage 81 of silver metallic display through black, blue, green, yellow, pink (red) in accordance with the increase in applied voltage, as shown in the CIE 1931 chromaticity diagram in FIG. 9.

Consequently, the color liquid crystal display device of the present embodiment can display in multi-color in which colorful reflection colors continuously change on a bright silver metallic background without using a reflector, and an extremely distinctive display can be realized.

Next, a case when a back light 15 below the translucent absorbing film 14 is turned on under weak and dark surrounding light will be explained.

In the color liquid crystal display device of the present embodiment, when light is allowed to enter toward the visible side through the reflection-type polarizing film 13 while the back light 15 is turned on, in the light from the back light, the component parallel to the transmittable axis 13a of the reflection-type polarizing film 13 passes into the liquid crystal cell 10 and the component perpendicular to the transmittable axis 13a is reflected and sent back to the back light side 15.

Therefore, when transmitting light from the back light 15 is used, it works as a translucent-type birefringence system color liquid crystal display device.

When the back light 15 is turned on, the color liquid crystal display device of the present embodiment shields almost all the light from the back light and forms a dark state with no voltage applied on the liquid crystal cell 10.

Figure 10:
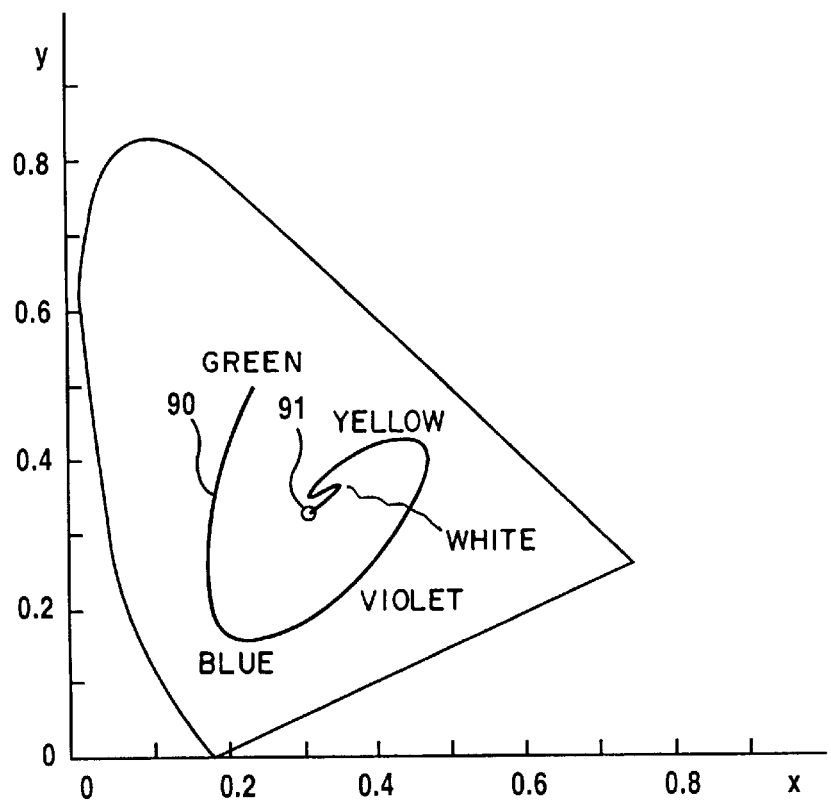

When voltage is applied between the first transparent electrode 3 and the second transparent electrode 4 of the liquid crystal cell 10 shown in FIG. 7, and the voltage is gradually increased, the transmitting light in the electrode portion exhibits color of the transmitting light which is shown by the chromaticity transition curve 90 in the CIE 1931 chromaticity diagram in FIG. 10, having a color change from a dark state of an initial stage 91 through white, yellow, violet, blue, and green in accordance with the increase in the voltage. This shows a complementary color relation to the color of the reflecting light. Accordingly, similar to the case in the first embodiment, when the back light 10 is used, the display color in a complementary color relation to the color from the reflected light can be obtained with the same applied voltage on the liquid crystal cell 10.

Figure 11:
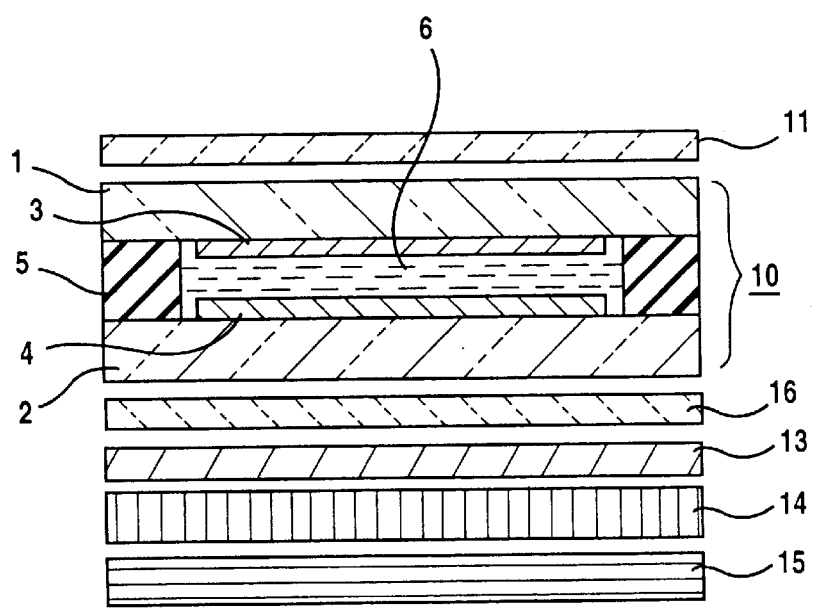
FIG. 11 is a schematic sectional view showing a structure of a modification of the second embodiment of the color liquid crystal display device according to the present invention.

Modification of the Second Embodiment: FIG. 11

In the above described embodiment, a biaxial stretching film is used as a retardation film 16, but a uniaxial stretching film can be used.

In the color liquid crystal display device of the above described second embodiment, as shown in FIG. 7, the retardation film 16, that is a birefringence layer, is disposed between the visible side of the liquid crystal cell 10 and the absorption-type polarizing film 11. However, as shown in FIG. 11, a retardation film 16 made of biaxial stretching film or uniaxial stretching film can be disposed between the side opposite to the visible side of the liquid crystal cell 10 and the reflection-type polarizing film 13.

Modification of the First and the Second Embodiments

In the first embodiment of the color liquid crystal display device according to the above described invention, the twist angle of the liquid crystal cell 10 is set to be 240°, the twist angle in the second embodiment is set to be 220°, and the STN liquid crystal cell is used for both, but all STN-type liquid crystal cells work if they have a twist angle from 180 to 270°

Additionally, a translucent absorbing film 14 can be omitted to make the upper surface of the back light 15 to serve as the translucent absorbing film 14. When a source of light is provided in an instrument having the color liquid crystal display device inside thereof, the back light 15 can also be omitted.

The liquid crystal cell used for the color liquid crystal display device of the present invention is not limited to an STN-type liquid crystal cell, and a twist nematic (TN)-type liquid crystal cell having a twist angle of around 90° can be used, provided that it has a structure so as to display a silver metallic reflecting color when no voltage is applied and a displaying color by birefringence when voltage is applied. It is also possible to use a homogeneous-type liquid crystal cell having a twist angle of nearly zero degrees.

Figure 17:
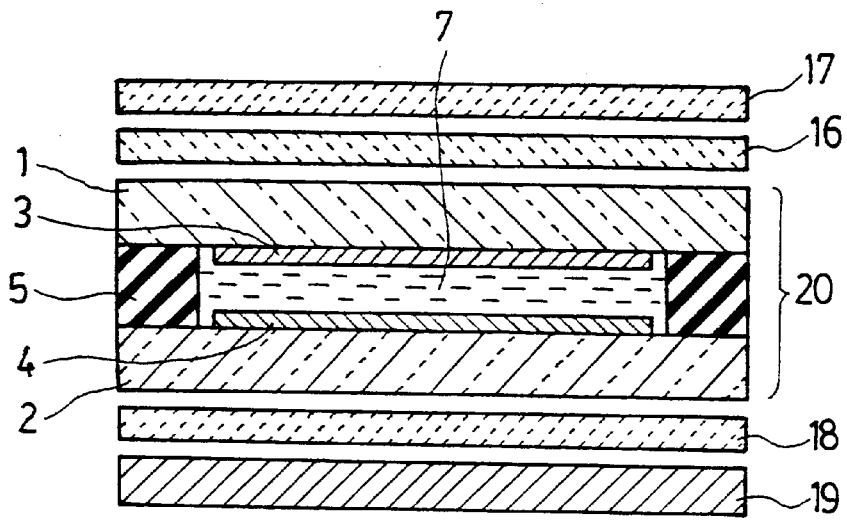
FIG. 17 is a schematic sectional view showing an example of the structure of a conventional color liquid crystal display device.
Figure 18:
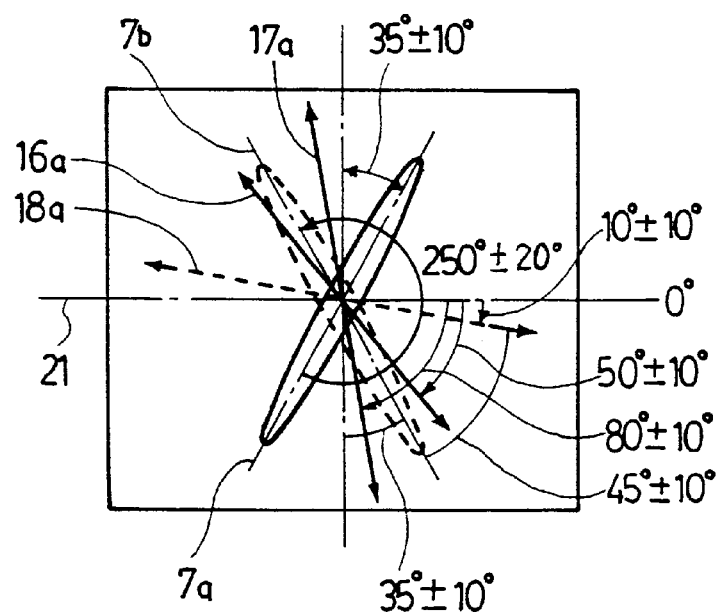
FIG. 18 is a plane view showing an angle of an optical axis in the conventional color liquid crystal display device.
Figure 19:
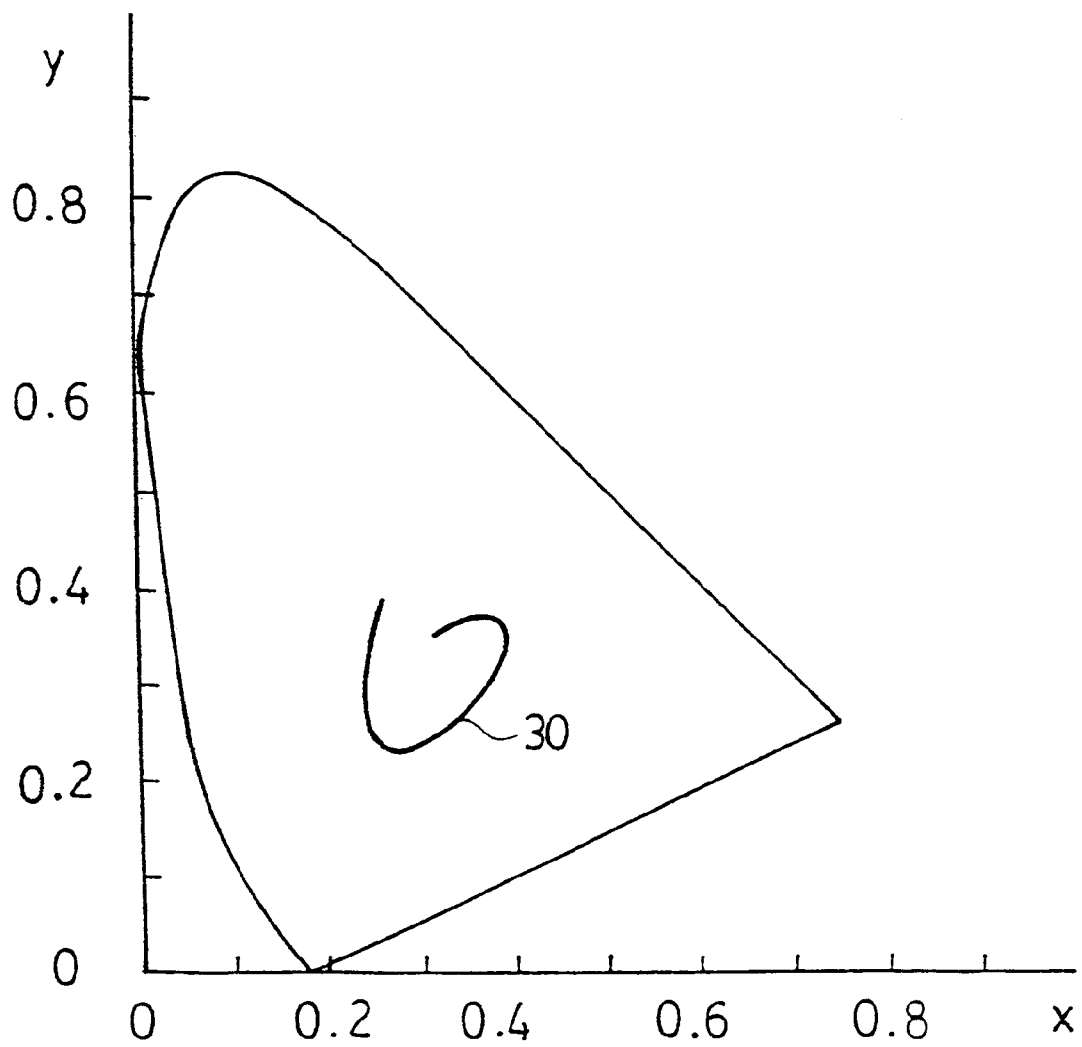
FIG. 19 is the CIE 1931 chromaticity diagram showing chromaticity transition curve in the conventional color liquid crystal display device.

Conventional Color Liquid Crystal Display Device: FIG. 17 to FIG. 19

Before explaining the third and fourth embodiments of the color liquid crystal display device according to the present invention, the conventional color liquid crystal display device as a premise will be explained.

FIG. 17 shows a configuration of the conventional birefringence-type color liquid crystal display device published in the above described Japanese Patent Laid-open Bulletin No. Hei 9-5072, and FIG. 18 shows angles of the optical axes to explain the display principle. The basis axis 21 of the angles in FIG. 18 is the same as the basis axis in FIG. 2 and FIG. 8.

The conventional liquid crystal display device is formed to have a liquid crystal cell 20 with an upper glass substrate 1 and a lower glass substrate 2 adhered together through a sealing material 5, and a twist liquid crystal 7 in which liquid crystal molecules are twistedly aligned, filled and sandwitched in the gap between the upper glass substrate and the lower glass substrate.

A retardation film 16 is disposed at the visible side (upper side) of the liquid crystal cell in such a manner that the phase delay axis 16a forms an angle of 50°±10° clockwise with the basis axis 21, and an upper polarizing film 17 is further disposed above the retardation film 16 in such a manner that the absorption axis 17a forms an angle of 80°±10° clockwise with respect to the basis axis 21.

A lower polarizing film 18 is disposed at the side opposite (lower side) to the visible side of the liquid crystal cell 20 and is disposed such that the absorption axis 18a forms an angle of 10°±10° clockwise with respect to the basis axis 21, and a reflecting film 19 is further disposed below the lower polarizing film 18.

In the liquid crystal 20, the alignment direction 7a of the upper liquid crystal molecules forms an angle of 55°±10° counterclockwise with respect to the basis axis 21, and the alignment direction 7b of the lower liquid crystal molecules forms an angle of 55°±10° clockwise with respect to the basis axis 21. The twist angle of the liquid crystal molecules from the alignment direction 7a of the upper liquid crystal molecules to the alignment direction 7b of the lower liquid crystal molecules is 250°±20° counterclockwise.

Regarding the dispositional relationship between the polarizing films 17, 18 and the liquid crystal molecules in the liquid crystal cell 20, they are disposed at an angle which cause the largest birefringence effect, that is, they are disposed in such a manner that an angle formed between the optical axes (transmittable axis or absorption axis) of the polarizing films 17 and 18 and the liquid crystal molecules adjacent to the optical axes is around 45°.

In the example shown in FIG. 18, the angle formed with the alignment direction 7b of the liquid crystal molecules in contact with the inside face of the lower glass substrate 2 of the liquid crystal 7 in the liquid crystal cell 20, and the absorption axis 18a of the lower polarizing film 18 is set to be 45°±10°.

The Δnd value of the liquid crystal cell 20 and the retardation value of the retardation film 16 have not so much difference, and they are nearly the same or the difference is at least within 200 nm, if any.

A display principle of the color liquid crystal display device will be explained here.

Incident light from the visible side (the upper side in FIG. 17) becomes linearly polarized light after passing through the upper polarized film 17, and when it passes through the retardation film 16 it becomes elliptic polarized light affected by the birefringence effect and enters into the liquid crystal cell 20. Here again it is affected by the birefringence effect brought about by the liquid crystal cell 20 and the elliptic polarized state is changed. Since the liquid crystal cell 20 can change the birefringence effect by applying voltage, the incident light passes through the lower polarizing film in differently polarized states depending upon the voltage applied.

Consequently, by controlling the applied voltage, the spectral characteristics of light passing through the lower polarizing film 18 can be controlled and light having different spectral characteristics, namely, differently colored light, can be obtained. The colored light is reflected by the reflector 19 and returned to the visible side. Accordingly, color display having a plurality of colors can be realized with one pixel.

FIG. 19 shows the chromaticity transition curve on the CIE 1931 chromaticity diagram when voltage applied to the electrodes 3 and 4 of the liquid crystal cell 20 of the color liquid crystal display device is gradually increased from zero. The displaying color changes along the transition curve 30 on the chromaticity diagram in FIG. 19 from white with no voltage applied through red, blue, and green in accordance with the increase in voltage.

However, such a structure is not the best for a birefringence-type color liquid crystal display device and it is difficult to obtain ideal spectral characteristics at the time of displaying each color. From the point of view of color reproducibility, it is considerably inferior in spectral characteristics to a device using color filters.

As a cause, it can be said that there is a difference in the wavelength dependence characteristics between the Δnd of the liquid crystal cell 20, and the retardation of the retardation film 16. Moreover, there is a difference in birefringence effect due to the presence or absence of twist in the liquid crystal cell 20, and the retardation film 16.

Such a birefringence type color liquid crystal display device combines the birefringence effect due to the retardation film and the birefringence effect due to the liquid crystal cell, but by changing the birefringence effect of the liquid crystal cell through the applied voltage, the total birefringence effect is controlled.

Regarding the dispositional relation between the retardation film and the liquid crystal cell, they are arranged in such a direction that the total retardation is basically canceled. This is because the birefringence effect is minimized as much as possible when no voltage is applied to minimize coloring of the incident light. In order to obtain the desired coloring, the total retardation is increased by applying voltage and decreasing the retardation of the liquid crystal cell. Through this process, the incident light receives the birefringence effect depending upon the retardation, and the coloring effect appears.

In the conventional birefringence-type color liquid crystal display device, as aforementioned, by equalizing the retardation value (phase difference) of the retardation film with the Δnd value of the liquid crystal cell, the total sum of the retardation value at the time that no voltage is applied is made substantially zero to obtain a white color.

When a stretched film is used for the retardation film, since the wavelength dependence characteristics of the Δnd value of the liquid crystal cell and the retardation value of the retardation film are different from each other, and the liquid crystal cell has a twist while the retardation film has no twist, a difference in both birefringence effects to the incident light is produced. Therefore, in order to obtain white display when no voltage is applied, it is necessary to adjust an arrangement angle of the retardation film and the polarizing film.

The white display at the time when no voltage is applied can be achieved by setting the arrangement angle of the retardation film and the polarizing film. However, when trying to display several desired colors as in a color liquid crystal display device, merely setting the arrangement angle of the retardation film and the polarizing film is insufficient, and the color purity of the displaying color is lowered due to the difference in the wavelength dependence characteristics of the Δnd value of the above described liquid crystal cell and the retardation value of the retardation film, and due to the difference in the birefringence effect resulting from the presence and absence of twist of the liquid crystal cell and the retardation film.

In particular, the lowered color purity that is mainly due to the mixing of desired colors and other colors resulting from the difference of the wavelength dependency is large.

Actually, when the wavelength dependency characteristics of the Δnd value of the liquid crystal cell and that of the retardation value of the retardation film are compared, the Δnd value of the liquid crystal cell has a larger dependency on wavelength. That is, even when the Δnd value of the liquid crystal cell and the retardation value of the retardation film are made equal around the central wavelength of λ=550 nm, the Δnd value of the liquid crystal cell and the retardation value of the retardation film differ from each other in the range of shorter wavelength regions and longer wavelength regions.

Accordingly, when a desired color is displayed, the ideal spectral characteristic for the desired color is not obtained and a color having a wavelength region other than that for the desired color is mixed therein, and the chroma is lowered.

The effect by the difference in wavelength dependency characteristics between the Δnd value of the liquid crystal cell and the retardation value of the retardation film will be explained using FIG. 16.

The Δnd value of the liquid crystal cell has a wavelength dependency characteristic such that the Δnd value of the liquid crystal cell becomes large on the shorter wavelength side and becomes small on the longer wavelength side. The liquid crystal material has a wavelength dependency characteristic in that when the Δnd value is assumed to be 1 at a wavelength of λ=550 nm, the Δnd value is 1.1 at wavelength λ=450 nm, and the Δnd value is 0.92 at wavelength λ=650 nm.

The wavelength dependency characteristic (the solid line 25 in FIG. 16) of the liquid crystal cell having a Δnd value of 1500 nm at the wavelength λ=550 nm has a Δnd value of 1650 nm at the wavelength λ=450 nm, and the Δnd value of 1380 nm at a wavelength λ=650 nm. That is, the liquid crystal cell having a Δnd value of 1500 nm at a wavelength λ=550 nm has the following wavelength dependency wherein the Δnd value at a wavelength λ=450 nm is 150 nm larger than the Δnd value at a wavelength λ=550 nm, and the Δnd value at a wavelength λ=650 nm is 120 nm smaller than the Δnd value at a wavelength λ=550 nm.

Here, if the wavelength dependency characteristic of the retardation value of the retardation film is the same as the wavelength dependency characteristic of the Δnd value of the liquid crystal cell, there arises no differences at the central regions of wavelength λ=550 nm, the shorter wavelength regions, and the longer wavelength regions, but actually, the wavelength dependency of the retardation value of the retardation film is smaller than that of the liquid crystal cell. For instance, when the retardation value of the retardation film at a wavelength λ=550 nm is assumed to be 1, it has a wavelength dependency characteristic in which the retardation value at λ=450 nm is 1.08, and the retardation value at λ=650 nm is 0.94.

The wavelength dependency characteristic (the broken line 26 in FIG. 16) of the retardation film having a retardation value of 1500 nm at a wavelength λ=550 nm has the retardation value of 1620 nm at a wavelength λ=450 nm, and the retardation value of 1410 nm at a wavelength λ=650 nm. That is, it has a wavelength dependency characteristic in that the retardation value at a wavelength λ=450 nm is 120 nm larger than the retardation value at a wavelength λ=550 nm, and the retardation value at a wavelength λ=650 nm is 90 nm smaller than the Δnd value at a wavelength λ=550 nm.

When this is compared with the liquid crystal cell having the Δnd value of 1500 nm at a wavelength λ=550 nm, the Δnd value of the liquid crystal cell is 30 nm larger at λ=450 nm, and, conversely, at λ=650 nm the Δnd value of the liquid crystal cell is 30 nm smaller than the retardation value. Accordingly, a mismatch arises between the Δnd value of the liquid crystal cell and the retardation value of the retardation film in the shorter wavelength region and longer wavelength region.

Due to the mismatch, when trying to display a desired color, the ideal spectral characteristic for the desired color cannot be obtained and the color saturation is lowered because colors having other wavelengths mix into the desired color.

Third and Fourth Embodiments of the Present Invention : FIG. 7, FIG. 11 to FIG. 16

The third and fourth embodiments of the present invention are intended to obtain a color liquid crystal display device which solves the above described disadvantage in the second embodiment, and to enable a characteristic display of the above described reflection-type and transmission-type, having an excellent color reproductivity.

Since the fundamental dispositional configuration of the liquid crystal cell, the polarizing film, and the retardation film which is a birefringence layer in the third and fourth embodiments of the color liquid crystal display device according to the present invention is the same as that in the second embodiment of the color liquid crystal display device of the present invention shown in FIG. 7 or FIG. 11, the explanation thereof will be omitted.

In the third and the fourth embodiments of the color liquid crystal display device according to the present invention, considering the difference between the wavelength dependency characteristic of the Δnd value of the liquid crystal cell 10 and that of the retardation value of the retardation film 16, and to decrease this difference, it is configured to have a larger retardation value of the retardation film 16 than the Δnd value of the liquid crystal cell 10 by 250 to 350 nm.

Here, the explanation will be described by using an example in which the Δnd value of the liquid crystal cell 10 is set to be 1500 nm, that is the same value as the above described example, and the retardation value of the retardation film 16 is set to be 1800 nm, that is 300 nm larger than the Δnd value of the liquid crystal cell 10. The wavelength dependency characteristic of the liquid crystal cell 10 and the retardation film 16 is set to be the same as the example shown in FIG. 16.

Figure 16:
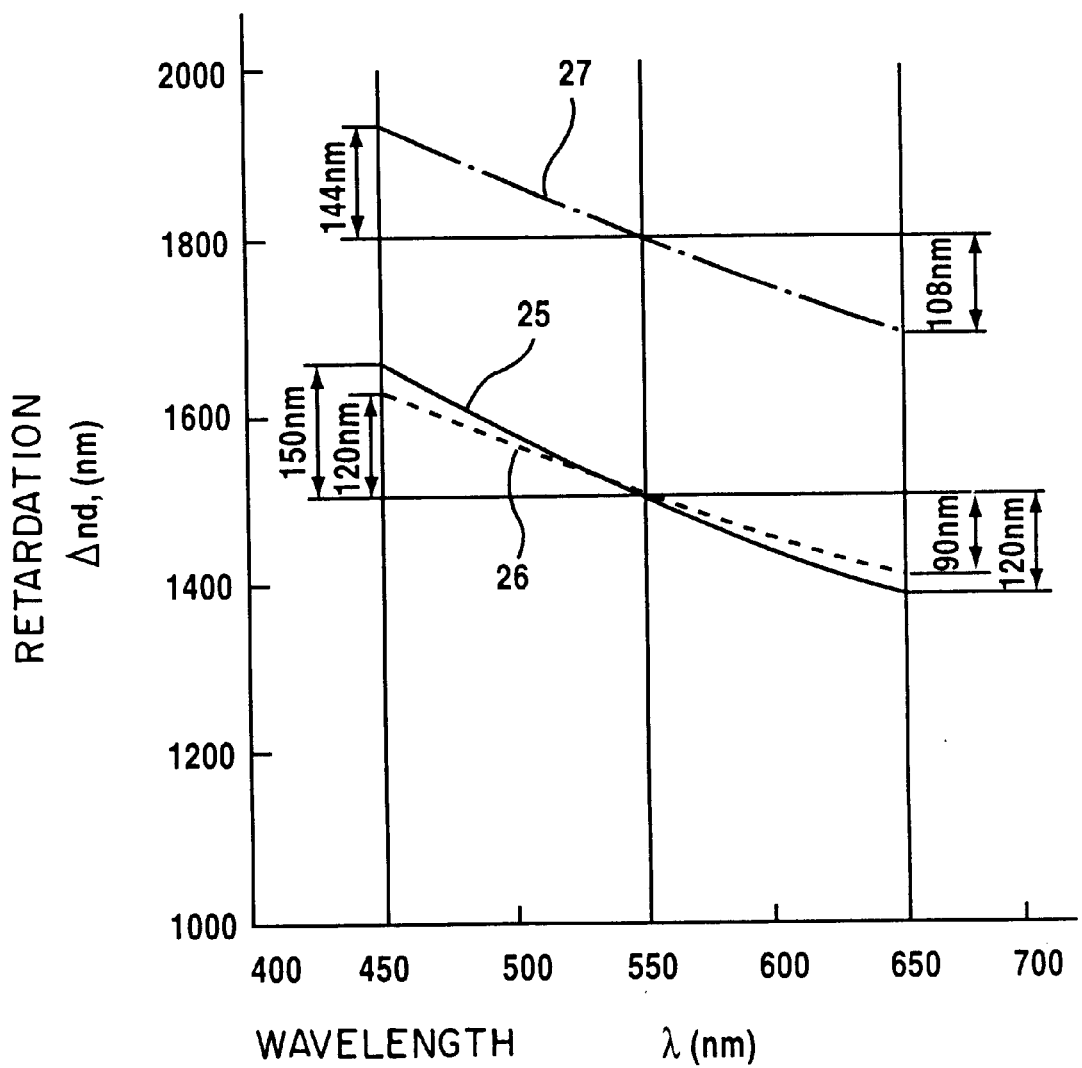
FIG. 16 is a diagram showing the wavelength dependence characteristics of Δnd value of the liquid crystal cell and the retardation value of the retardation film.

In FIG. 16, the wavelength dependency characteristic (the one-dotted chain line 27) of the retardation film is shown having a retardation value of 1800 nm at λ=550 nm, a retardation value of 1944 nm at λ=450 nm, and at a retardation value of 1692 nm at λ=650 nm.

That is, the retardation value at λ=450 nm is 144 nm larger than the retardation value at λ=550 nm and the retardation value at λ=650 nm is 108 nm smaller than the retardation value at λ=550 nm.

When this is compared with the liquid crystal cell having a Δnd value of 1500 nm at a wavelength λ=550 nm, the Δnd value of the liquid crystal cell is larger than the retardation value at λ=450 nm, but the difference is 6 nm. Conversely, the Δnd value of the liquid crystal cell is smaller at λ=650 nm, but the difference is 12 nm.

When these values are compared with the retardation film having a retardation value of 1500 nm at λ=550 nm, it is ⅕ of that at λ=450 nm, and less than half of that at λ=650 nm.

That is, the mismatch of the wavelength dependency characteristics of the Δnd value of the liquid crystal cell and the retardation value of the retardation film in the shorter wavelength side and in the longer wavelength side can be reduced satisfactorily, and when a desired color is displayed, a reproduced color with high color purity can be obtained without being mixed with colors in other wavelength regions and the spectral characteristics thereof are close to ideal.

Furthermore, the third and fourth embodiments of the present invention are characterized in that the angle formed between the transmittable axis of the reflection-type polarizing film 13 disposed opposite to the visible side of the liquid crystal cell 10 out of the pair of polarizing films 11, 13, and the direction along the long axis of the liquid crystal molecules on the inside surface of the lower glass substrate 2 of the liquid crystal cell 10 is 35°±5°. This is because, as previously described, the liquid crystal cell and the retardation film have a difference in birefringence effects in accordance with presence and absence of twist.

For instance, like a compensating cell, when the twist angles of the liquid crystal cell and the compensating cell are equal with no difference in the birefringence effect, it is advisable to form an angle between the optical axis of the polarizing film and the direction along the long axis of the liquid crystal molecules on the substrate surface that is around 45° to cause the largest birefringence effect. However, when a stretched retardation film is used, since there is a difference between presence and absence of twist with the liquid crystal cell and the retardation film, it is not effective to set the angle to around 45°.

Therefore, in the third and fourth embodiments of the present invention, the angle formed between the optical axis of the polarizing film and the direction along the long axis of the liquid crystal molecules on the substrate surface was studied, and the angle between the direction along the long axis of the liquid crystal molecules on the inside surface of the lower substrate 2 of the liquid crystal cell 10 and the transmittable axis of the reflection-type polarizing film 13 is set at an angle of around 35° so that the best color reproductivity can be obtained.

Furthermore, in each embodiment of the present invention, the twist angle of the liquid crystal cell is formed to be at 180 to 270°, but particularly when the twist angle is set to be narrower, since the aforementioned difference in the birefringence effect between the liquid crystal cell and the retardation film caused by the presence and absence of the twist becomes small, the color reproductivity is improved.

However, when the twist angle is set to be too small, since a sharp responsivity is lowered and the display becomes unsuitable for multiplex driving, it is desirable to set the twist angle equal to or larger than 180°.

By the arrangement described above, a birefringence-type color liquid crystal display device can be optimized, and the range of color reproduction by applied voltage can be much more enlarged than that of the conventional birefringence-type color liquid crystal display devices.

By using a reflection-type polarizing film as a polarizer disposed on the side opposite to the visible side of the liquid crystal cell, a reflection-type display by external light and a transmission-type display by a back light are made possible, and color display can be performed with colors in complementary color relations with each other, and in a reflection-type play, a mirror image metallic display can be obtained on the totally relecting portion. These advantages are the same as in the case of the first and second embodiments.

Figure 12:
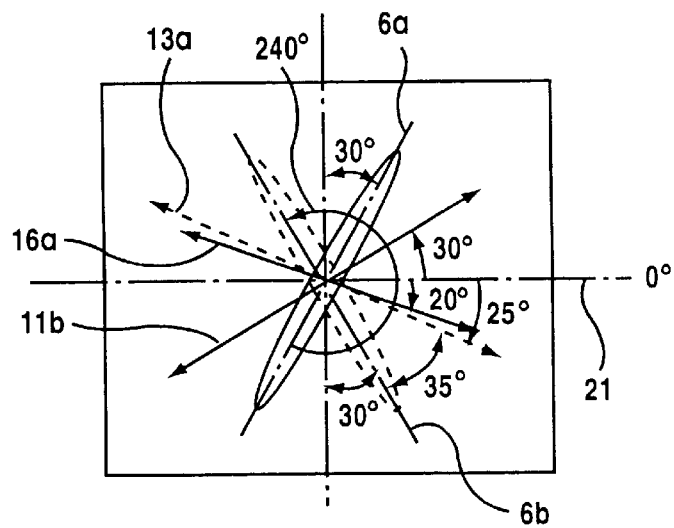
FIG. 12 is a plane view showing an angle of an optical axis in the color liquid crystal display device of a third embodiment according to the present invention.
Figure 13:
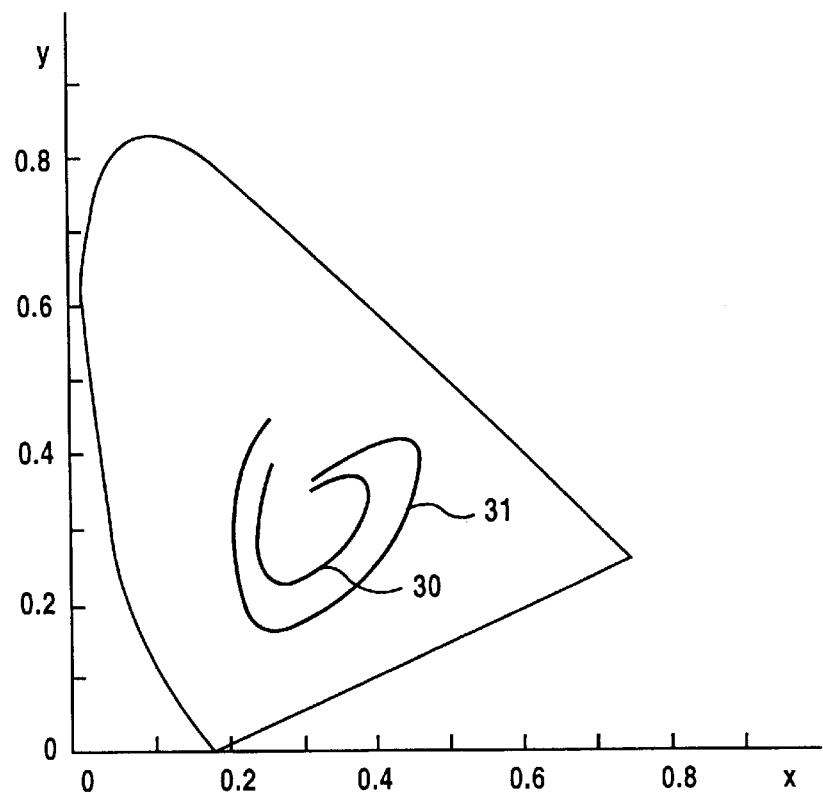
FIG. 13 is the CIE 1931 chromaticity diagram showing chromaticity transition curve in the color liquid crystal display devices of the second embodiment and a conventional example.

Third Embodiment: FIG. 12 and FIG. 13

Next, the third embodiment of the color liquid crystal display device of the present invention will be explained with reference to FIG. 12 and FIG. 13.

FIG. 12 is a plane view showing the arrangement of the optical axis of the color liquid crystal display device of the third embodiment and the basis axis 21 is the same as shown in FIG. 2 and FIG. 8.

The fundamental configuration of the color liquid crystal display device is the same as shown in FIG. 7 and FIG. 11.

A retardation film 16 is disposed above or below an upper glass substrate 1 of the liquid crystal cell 10 in such a manner that the phase delay axis 16a forms an angle of 20° clockwise with respect to the basis axis 21, and an absorption-type polarizing film 11 is further disposed above the retardation film 16 in such a manner that the absorption axis 11b forms an angle of 30° counterclockwise (transmittable axis is 120°) with respect to the basis axis 21.

A reflection-type polarizing film 13 is disposed below a lower glass substrate 2 of the liquid crystal cell 10 in such a manner that the transmittable axis 13a forms an angle of 25° clockwise with respect to the basis axis 21, and a translucent absorbing film 14 and a back light 15 are further disposed in that order below the reflection-type polarizing film 13.

In the liquid crystal cell 10, the alignment direction 6a of the liquid crystal molecules on the inside surface of the upper glass substrate 1 forms an angle of 60° counterclockwise with respect to the basis axis 21 and the alignment direction 6b of the liquid crystal molecules on the inside surface of the lower glass substrate 2 forms an angle of 60° clockwise with respect to the basis axis 21.

The twist angle of the liquid crystal molecules from the alignment direction 6a of the liquid crystal molecules in the inside surface of the upper glass substrate 1 to the alignment direction 6b of the liquid crystal molecules in the inside surface of the lower glass substrate 2 is 240° counterclockwise with respect to the basis axis 21.

In the present embodiment, due to the above setting, an angle formed between the transmittable axis 13a of the reflection-type polarizing film 13 disposed below the liquid crystal cell 10 out of the pair of polarizing films 11 and 13, and the long axis direction 6b of the liquid crystal molecules on the inside surface of the lower glass substrate 2 of the liquid crystal cell 10 is 35°, thereby causing an effect that the difference in birefringence due to the presence and absence of the twist in liquid crystal cell 10 and the retardation film 16 minimizes influence on the color reproductivity.

A specific example of the third embodiment will be shown below.

As material for the nematic liquid crystal 6, RDP-60166 (trade name), manufactured by Rodick Co., Ltd. is used, and the Δnd value of the liquid crystal cell 10 is designed to be 1470 nm.

As the retardation film 16, NRZ polycarbonate film, manufactured by Nittoh Denko k.k., having a retardation of 1770 nm is used. The film has a relation of nx>nz>ny, where nx is the refractive index in the stretching direction on the film plane, ny is the refractive index in the direction perpendicular to the above described stretching direction on the plane, and nx is the refractive index in the thickness direction. That is, the retardation value of the retardation film 16 is 300 nm larger than the Δnd of the liquid crystal cell.

FIG. 13 shows the chromaticity transition curve 31 of the display color caused by voltage applied to the reflection-type display state of the color liquid crystal display device of the third embodiment with the chromaticity transition curve 30 of the above described conventional color liquid crystal display device in the CIE 1931 chromaticity diagram.

The chromaticity transition curve 31 obtained by the color liquid crystal display device of the third embodiment of the present invention in FIG. 13 shows a substantially white color when no voltage is applied, and the chromaticity changes through red, blue, and green in accordance with the increase of voltage in the same manner as in the case of the conventional color liquid crystal display device. However, it shows a wider range of the color reproductivity compared with the chromaticity transition curve 30 by the conventional color liquid crystal display device, and the color reproduction capability for red, blue, and green is considerably improved. That is, it becomes possible to display brighter red, blue, and green colors as well as an initial white color than in the display of color by the conventional display device.

Additionally, in the above embodiment, one sheet of the retardation film is used, but plural sheets of the retardation films can be used. The retardation value of the retardation film is set to be 300 nm larger than the Δnd value of the liquid crystal cell, but when the retardation value is larger than the Δnd value of the liquid crystal cell by 250 to 350 nm, any retardation film can be used without causing any problem.

In addition, the retardation film 16 can be disposed at the visible side of the liquid crystal cell 10 or at the side opposite to the visible side, as shown in FIG. 7 or in FIG. 11.

The translucent absorbing film 14 can be formed by adhering a sheet made of a translucent absorbing material onto the back surface of the liquid crystal cell 10 or onto the upper surface of the reflection-type polarizing film 13, or by coating a translucent absorbing material to form a translucent absorbing layer.

The translucent absorbing film 14 can be omitted and the function of the translucent absorbing film 14 can be performed by the surface plane of the back light 15. Furthermore, when a light source is provided in an instrument having the color liquid crystal display device inside, the back light 15 can be omitted.

Figure 14:
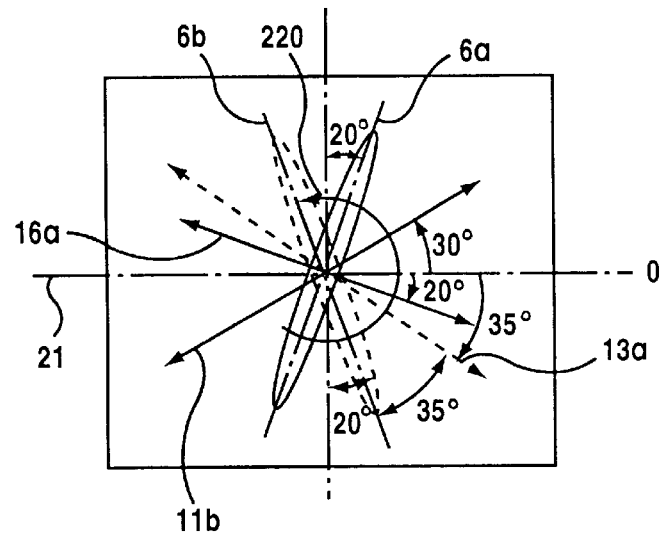
FIG. 14 is a plane view showing an angle of an optical axis in the color liquid crystal display device of a fourth embodiment according to the present invention.
Figure 15:
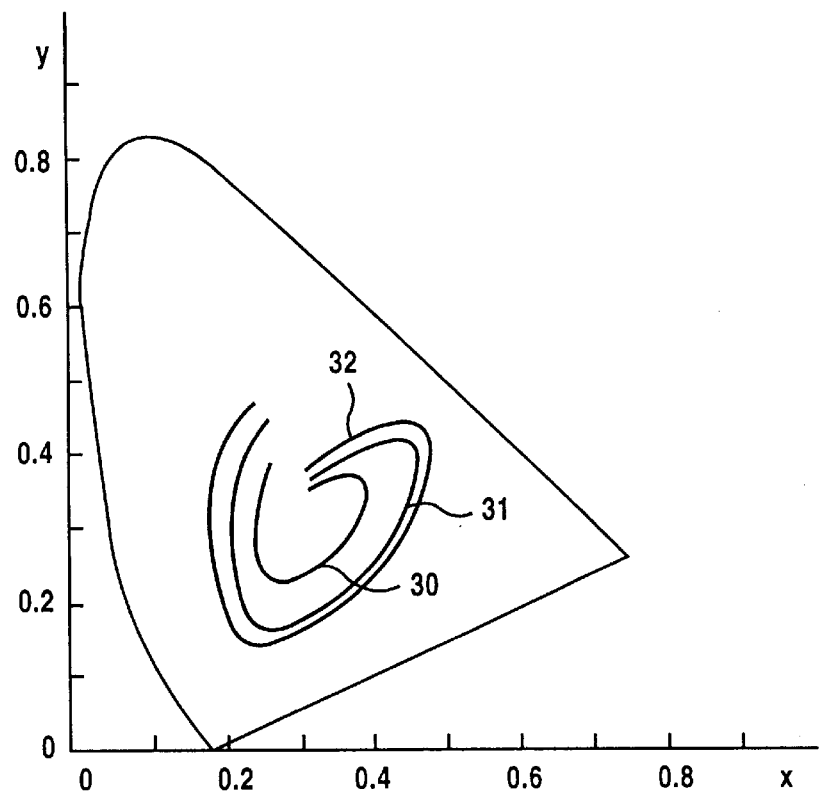
FIG. 15 is the CIE 1931 chromaticity diagram showing chromaticity transition curve in the color liquid crystal display devices of the second embodiment, conventional example and the third embodiment.

Fourth Embodiment: FIG. 14 and FIG. 15

Next, the fourth embodiment of the color liquid crystal display device of the present invention will be explained with reference to FIG. 14 and FIG. 15.

FIG. 14 is a plane view showing the disposition of the optical axis of the color liquid crystal display device of the fourth embodiment, and the basis axis 21 is the same as that in FIG. 2 and FIG. 8.

The fundamental configuration of the color liquid crystal display device is the same as shown in FIG. 7 and in FIG. 11 as in the case of the third embodiment.

In the previously described third embodiment, the twist angle of the liquid crystal cell 10 is set to be 240°, but the twist angle of the liquid crystal cell 10 of the fourth embodiment can be equal to or less than 220°.

In the color liquid crystal display device of the fourth embodiment of the present invention, the retardation film 16 is disposed at the visible side of the liquid crystal cell 10 or at the side opposite to the visible side in such a manner that the phase delay axis 16a forms an angle of 20° clockwise with respect to the basis axis 21 as shown in FIG. 14, and the absorption-type polarizing film 11 is further disposed in such a manner that the absorbing axis 11b forms an angle of 30° counterclockwise (transmittable axis forms 120°) with respect to the basis axis 21 on the visible side.

The reflection-type polarizing film 13 is disposed at the side opposite to the visible side of the liquid crystal cell 10 in such a manner that the transmittable axis 13a forms an angle of 35° clockwise with respect to the basis axis 21, and the translucent absorbing film 14 and the back light 15 are further disposed below the transmittable axis 13a.

The alignment direction 6a (long axis direction) of the liquid crystal molecules on the inside surface of the upper glass substrate 1 of the liquid crystal cell 10 forms an angle of 70° counterclockwise with respect to the basis axis 21, and the alignment direction 6b (long axis direction) of the liquid crystal molecules on the inside surface of the lower glass substrate 2 of the liquid crystal cell 10 forms an angle of 70° clockwise with respect to the basis axis 21.

Accordingly, the twist angle of the liquid crystal molecules aligned between the alignment direction 6a of the liquid crystal molecules on the inside surface of the upper glass substrate 11 of the liquid crystal cell 10 to the alignment direction 6b of the liquid crystal molecules on the inside surface of the lower glass substrate 2 is 220° counterclockwise.

In the present embodiment, due to the above setting, an angle formed between the transmittable axis 13a of the reflection-type polarizing film 13 disposed below the liquid crystal cell 10 out of the pair of polarizing films 11 and 13, and the alignment direction 6b of the liquid crystal molecules on the inside surface of the lower glass substrate 2 of the liquid crystal cell 10 is 35°, so that the influence on the color reproducibility caused by the difference of birefringence due to the presence and absence of the twist of the liquid crystal cell 10 and the retardation film 16 can be minimized.

A specific example of the fourth embodiment will be shown below.

As a material for the liquid crystal, RDP-60166 (trade name), manufactured by Rodick Co., Ltd., is used in a similar fashion as in the third embodiment, and the Δnd value of the liquid crystal cell 10 is designed to be 1470 nm. As the retardation film, NRZ polycarbonate film (trade name), manufactured by Nittoh Denko K.K., having a retardation of 1770 nm is used. The film has a relation of nx>nz>ny, where nx is the refractive index in the stretching direction on the film plane, ny is the refractive index in the direction perpendicular to the above described stretching direction on the plane, and nx is the refractive index in the thickness direction.

That is, the retardation value of the retardation film 16 is 300 nm larger than the Δnd of the liquid crystal cell.

FIG. 15 shows the chromaticity transition curve 32 of the display color caused by voltage applied to the reflection-type display state of the color liquid crystal display device of the fourth embodiment with the chromaticity transition curve 30 of the conventional color liquid crystal display device and the chromaticity transition curve 31 of the color liquid crystal display device of the above described third embodiment in the CIE 1931 chromaticity diagram.

The chromaticity transition curve 32 obtained by the color liquid crystal display device of the fourth embodiment of the present invention in FIG. 15 shows substantially white chromaticity coordinate when no voltage is applied, and the chromaticity coordinate changes through red, blue, and green in accordance with the increase of voltage.

The chromaticity transition curve 32 shows a wider range of color reproducibility compared with the chromaticity curve 31 obtained by the color liquid crystal display device of the third embodiment as well as the chromaticity curve 30 by the conventional color liquid crystal display device, and the color reproducibility of the red, blue and green colors is extensively improved.

By setting the twist angle of the liquid crystal cell 10 to be 220°, that is, smaller than 240° in the case of the color liquid crystal display device of the third embodiment, the difference in the birefringence effect between the presence and absence of the twist of the liquid crystal cell 10 and the retardation film 16 becomes smaller, and the color reproduction range is further widened than the chromaticity transition curve 31 by the color liquid crystal display device of the third embodiment.

In addition, various modifications described after the explanation of the aforementioned third embodiment can be similarly applied to the fourth embodiment.

What is claimed is:

1. A birefringence-type color liquid crystal display device, comprising:

a liquid crystal cell having a twist angle from 180 to 270° which is made by filling a nematic liquid crystal between a pair of transparent substrates having electrodes on confronting inside surfaces thereof;

a twisted retardation film provided on a visible side of said liquid crystal cell;

an absorption-type polarizing film disposed on an outside of said twisted retardation film; and a reflection-type polarizing film disposed on a side opposite to the visible side of said liquid crystal cell, wherein said absorption-type polarizing film is a polarizing film which absorbs linearly polarized light vibrating in a direction perpendicular to a transmittable axis of said polarizing film;

said reflection-type polarizing film is a polarizing film which reflects linearly polarized light vibrating in a direction perpendicular to a transmittable axis of said polarizing film, said twisted retardation film having a $\Delta$nd value that is equal to a $\Delta$nd value of said liquid crystal cell, and said transmittable axis of said reflection-type polarizing film forms an angle of 45° with respect to a long axis direction of the liquid crystal molecules contacting with the inside surface of the substrate which is on the side of said reflection-type film of said crystal cell.

2. The birefringence-type color liquid crystal display device according to claim 1, further comprising a back light disposed on the outside of said reflection-type polarizing film.

3. The birefringence-type color liquid crystal display device according to claim 1, further comprising a translucent absorbing member and a back light disposed on the outside of said reflection-type polarizing film, in that order.

4. A birefringence-type color liquid crystal display device, comprising:

a liquid crystal cell having a twist angle from 180 to 270° which is made by filling a nematic liquid crystal between a pair of transparent substrates having electrodes on confronting inside surfaces thereof;

a retardation film provided on a visible side of said liquid crystal cell;

an absorption-type polarizing film disposed on a outside of said retardation film;

a reflection-type polarizing film disposed on a side opposite to the visible side of said liquid crystal cell, wherein said absorption-type polarizing film is a polarizing film which absorbs linearly polarized light vibrating in a direction perpendicular to a transmittable axis of said polarizing film, said reflection-type polarizing film is a polarizing film which reflects linearly polarized light vibrating in a direction perpendicular to the transmittable axis of said polarizing film, said retardation film having a retardation value that is larger than a $\Delta$nd value of said liquid crystal cell, and said transmittable axis of said reflection-type polarizing film forms an angle of 60° with respect to a long axis direction of the liquid crystal molecules contacting with the inside surface of the substrate which is on the side of said reflection-type polarizing film of said liquid crystal cell.

5. The birefringence-type color liquid crystal display device according to claim 4, further comprising a back light disposed on the outside of said reflection-type polarizing film.

6. The birefringence-type color liquid crystal display device according to claim 4, further comprising a translucent absorbing member and a back light disposed on the outside of said reflection-type polarizing film, in that order.

7. A birefringence-type color liquid crystal display device, comprising:

a liquid crystal cell having a twist angle from 180 to 270° which is made by filing a nematic liquid crystal between a pair of transparent substrates having electrodes on confronting inside surfaces thereof;

one or more sheets of retardation films provided on a visible side of said liquid crystal cell;

an absorption-type polarizing film disposed on an outside of said retardation films; and a reflection type polarizing film disposed on a side opposite to the visible side of said liquid crystal cell, wherein said absorption-type polarizing film is a polarizing film which absorbs linearly polarized light having an electric-field component vibrating in a direction perpendicular to a transmittable axis of said polarizing film, said reflection-type polarizing film is a polarizing film which reflects linearly polarized light having an electric-field component vibrating in a direction perpendicular to a transmittable axis of said polarizing film, said retardation films having a retardation value in total that is 250 to 350 nm larger than a $\Delta$nd value which is expressed by the product of a difference $\Delta$n of the birefringence of the nematic liquid crystal of said liquid crystal cell and a cell gap d, that is the space between said pair of substrates, and the transmittable axis of said reflection-type polarizing film forms an angle in the range of 35°±5° with respect to a long axis direction of the liquid crystal molecules contacting with the inside surface of the substrate which is on the side of said reflection-type polarizing film of said liquid crystal cell.

8. The birefringence-type color liquid crystal display device according to claim 7, further comprising a back light disposed on the outside of said reflection-type polarizing film.

9. The birefringence-type color liquid crystal display device according to claim 7, further comprising a translucent absorbing member and a back light disposed on the outside of said reflection-type polarizing film, in that order.

* * * * *